(12) United States Patent
Burisch et al.

(10) Patent No.: US 11,079,142 B2
(45) Date of Patent: Aug. 3, 2021

(54) MIRROR FOR A SOLAR REFLECTOR, METHOD OF MIRROR ASSEMBLY AND MANAGEMENT SYSTEM IN A SOLAR FIELD

(71) Applicants: FUNDACIÓN CENER-CIEMAT, Sarriguren (ES); FUNDACIÓN TEKNIKER, Eibar (ES)

(72) Inventors: Michael Burisch, Sarriguren (ES); Marcelino Sánchez, Sarriguren (ES); Cristóbal Villasante Corredoira, Eibar (ES); Estíbaliz Aranzabe Basterrechea, Eibar (ES)

(73) Assignees: FUNDACION CENER-CIEMAT, Sarriguren (ES); FUNDACION TEKNIKER, Eibar (ES)

( * ) Notice: Subject to any disclaimer, the term of this patent is extended or adjusted under 35 U.S.C. 154(b) by 0 days.

(21) Appl. No.: 16/340,882

(22) PCT Filed: Oct. 10, 2017

(86) PCT No.: PCT/ES2017/070660
§ 371 (c)(1),
(2) Date: Apr. 10, 2019

(87) PCT Pub. No.: WO2018/069558
PCT Pub. Date: Apr. 19, 2018

(65) Prior Publication Data
US 2019/0264952 A1 Aug. 29, 2019

(30) Foreign Application Priority Data
Oct. 10, 2016 (ES) ................. ES201631313

(51) Int. Cl.
*F24S 50/00* (2018.01)
*F24S 23/70* (2018.01)
*G02B 17/06* (2006.01)

(52) U.S. Cl.
CPC ............... *F24S 50/00* (2018.05); *F24S 23/70* (2018.05); *F24S 23/82* (2018.05); *G02B 17/06* (2013.01); *Y02E 10/40* (2013.01); *Y02E 10/52* (2013.01)

(58) Field of Classification Search
CPC . F24S 50/00; F24S 23/82; F24S 23/70; Y02E 10/41; Y02E 10/45; Y02E 10/52; G02B 5/08; G02B 5/0808; G02B 17/06
(Continued)

(56) References Cited

U.S. PATENT DOCUMENTS 2,259,372 A * 10/1941 Geisler ................. H01L 31/055
136/257
3,278,811 A * 10/1966 Mori .................... H01L 31/0547
136/244
(Continued)

FOREIGN PATENT DOCUMENTS

EP 2548232 B1 * 8/2017 ................ F21S 9/03
ES 2534037 T3 4/2015
(Continued)

OTHER PUBLICATIONS

"Vulcain Controllers & Sensors.pdf", Vulcain / Honewell Control System, 2007. (Year: 2007).*
(Continued)

*Primary Examiner* — Daniel E. Namay
(74) *Attorney, Agent, or Firm* — Knobbe, Martens, Olson & Bear LLP

(57) ABSTRACT

A mirror for a solar reflector has at least one sensor integrated in the body of the mirror itself, the body of the mirror
(Continued)

being all the layers of the mirror. At least one processor is integrated in the body of the mirror, associated with the sensor, thus generating an intelligent device and an intelligent mirror or smart mirror. A method of assembling the mirror itself and a management system for mirrors that make up a solar field is provided.

36 Claims, 10 Drawing Sheets

(58) Field of Classification Search
USPC ..... 126/572, 573, 578, 684, 701; 250/491.1; 353/3; 359/865, 877
See application file for complete search history.

(56) References Cited

U.S. PATENT DOCUMENTS

| | | | | |
|---|---|---|---|---|
| 6,127,620 | A * | 10/2000 | Tange | H01L 31/0543 |
| | | | | 136/246 |
| 7,906,750 | B2 * | 3/2011 | Hickerson | F24S 50/00 |
| | | | | 250/203.4 |
| 8,490,619 | B2 * | 7/2013 | Guha | H02S 20/32 |
| | | | | 126/601 |
| 8,581,164 | B2 * | 11/2013 | Wu | G01S 3/7861 |
| | | | | 250/203.4 |
| 8,651,100 | B2 * | 2/2014 | Pfahl | F24S 30/452 |
| | | | | 126/573 |
| 9,057,539 | B2 * | 6/2015 | Guha | H01L 31/054 |
| 9,606,340 | B2 * | 3/2017 | Hines | G01S 17/66 |
| 10,030,635 | B2 * | 7/2018 | Taillemite | F03G 6/06 |
| 10,112,457 | B2 * | 10/2018 | Bytzek | H05B 1/0236 |
| 2008/0236568 | A1 | 10/2008 | Hickerson | |
| 2009/0249787 | A1 | 10/2009 | Pfahl | |
| 2010/0218758 | A1 * | 9/2010 | Guha | F24S 50/20 |
| | | | | 126/601 |
| 2011/0000478 | A1 | 1/2011 | Reznik | |
| 2012/0012157 | A1 * | 1/2012 | Adell Argiles | F24S 20/67 |
| | | | | 136/248 |
| 2013/0032196 | A1 * | 2/2013 | Dipankar | F24S 50/20 |
| | | | | 136/246 |
| 2013/0233305 | A1 * | 9/2013 | Guha | H02S 20/32 |
| | | | | 126/714 |
| 2013/0283794 | A1 * | 10/2013 | Taillemite | B29D 11/00596 |
| | | | | 60/641.15 |
| 2014/0041698 | A1 * | 2/2014 | Adler | B08B 1/008 |
| | | | | 134/56 R |
| 2014/0299176 | A1 * | 10/2014 | Gerster | H01L 31/052 |
| | | | | 136/246 |
| 2015/0014424 | A1 * | 1/2015 | Bytzek | G01K 13/00 |
| | | | | 237/28 |
| 2017/0063291 | A1 * | 3/2017 | Lee | F24S 23/77 |
| 2018/0145198 | A1 * | 5/2018 | Saito | H01L 31/054 |
| 2018/0198403 | A1 * | 7/2018 | Nagai | H01L 31/048 |

FOREIGN PATENT DOCUMENTS

| | | | | |
|---|---|---|---|---|
| KR | 100913074 B1 * | 8/2009 | ....... | H01L 31/02024 |
| WO | WO-03052330 A1 * | 6/2003 | ............ | F24S 23/80 |
| WO | WO-2010078473 A2 * | 7/2010 | ............ | H02S 40/44 |

OTHER PUBLICATIONS

International Search Report & Written Opinion, dated Jan. 5, 2018, in International Patent Application No. PCT/ES2017/070660.

* cited by examiner

MIRROR FOR A SOLAR REFLECTOR, METHOD OF MIRROR ASSEMBLY AND MANAGEMENT SYSTEM IN A SOLAR FIELD

PRIORITY AND CROSS REFERENCE TO RELATED APPLICATIONS

This application is the U.S. National Stage Application under 35 U.S.C. § 371 of International Application No. PCT/ES2017/070660, filed Oct. 10, 2017, designating the U.S. and published in English as WO 2018/069558 A1 on Apr. 19, 2018, which claims the benefit of Spanish Patent Application No. P201631313, filed Oct. 10, 2016. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present invention, in general, relates to a mirror for a solar reflector comprising at least one sensor integrated in the body of the mirror itself, the body of the mirror being understood as all the layers that comprise the same. Furthermore, integrating at least one processor in the body of the mirror, associated with the sensor, gives rise to an intelligent device and thus, to an intelligent mirror or smart mirror. The invention also relates to a method of assembly of the mirror itself and to a management system for mirrors that make up a solar field.

The invention is applicable in the field of solar energy and in particular that of concentrating solar energy.

BACKGROUND

Numerous types of solar reflectors are known in the state of the art, which include one or more mirrors or facets such as those shown in FIGS. 19 to 24. A solar reflector is made up of the mirror or mirrors themselves, the structure on which the mirror or mirrors are installed, the pillar on which the structure is installed and the foundation for supporting the reflector, among others.

One such type of solar reflector is the heliostat, a mobile system made up of one or various mirrors that move in order to reflect sunlight on the receiver of a tower. Likewise, other examples are Parabolic Trough Collectors, made up of a series of mirrors that form a cylindrical surface with a parabolic section that reflects the radiation in a linear receiver. Similarly, other solar systems use mirrors to redirect and/or concentrate the radiation by means of solar reflectors integrated in Fresnel systems, parabolic dishes, beam-down systems, solar furnaces and other configurations that include one or several reflections.

These reflectors have thermal, thermoelectric and photovoltaic applications.

The energy production of these systems decreases as the mirrors lose their properties (they become dirty, they move in their supporting structure, they lose their orientation, etc.) and therefore the amount of sunlight reflected on the receiver is lower, which also lowers efficiency.

In order to find out the status or situation of the mirrors or facets, technologies and sensors have been developed that involve either the installation of sensors, cameras or artificial vision devices or other devices at the site or solar field itself in which the reflectors are installed, or the displacement of an operator to said field for inspection of the components of the system, including the mirrors. The following means of verification and/or control are known in the state of the art:

An operator moves around the field and measures the reflectivity of the mirrors, (which varies according to the level of dirt), in different parts of the field and identifying those mirrors and/or receivers that are dirty and/or damaged or broken, Systems (photogrammetry, deflectometry, etc.) for verifying the geometrical accuracy of the collectors, Methods that, by fixing cameras or artificial vision devices in the reflectors and targets in the field, enable defining the orientation and the axes of rotation of the collectors.

Devices for measuring the level of dirt on the mirror.

Etc.

In any case, all the known systems require a mirror or facet of the conventional type in the sector, which by means of elements that are external to the mirror enable knowing the status thereof. Said external elements can either be devices used by operators that move around the solar field in which the mirrors are located, devices coupled to the mirror or to some element of the solar reflector of which the mirror forms part, or devices located in the solar field. Likewise, such devices may be sensors for measuring the dirt on the mirror, low-cost cameras, sensors for measuring the orientation of the mirror, etc.

A solar field should be understood as a group of solar reflectors with their mirrors, their supporting structures, the tracking system that actuates them, their control elements, as well as any other device such as systems of control and communication with the reflectors, distribution and control elements of the flow of the heat transfer fluid, etc. A solar plant should be understood as a plant that comprises a solar field and those systems and subsystems that are necessary for converting heat from solar energy into useful energy.

All the foregoing systems that reflect the state of the art have a drawback, which consists in having to use external devices that require additional installation tasks such as, for example, the proper installation of the sensor on some kind of element of the reflector (for example, on the supporting structure of the mirrors) and the proper referencing of the sensor with respect to the mirror. This additional handling when manufacturing the reflector implies additional costs both in time and resources, as well as in the availability of the system. Furthermore, there exists a risk due to the handling itself of the mirror and the structure thereof, a risk that can lead to moving or deforming the mirror and its supporting structure consequently bringing about loss of orientation thereof, thus forcing repositioning of the mirror, resulting in additional cost. Another risk, albeit to a lesser extent, consists in that scratching or breaking can damage the surface of the mirror. In other words, if two sensors with different features are to be installed in the reflector in which a mirror is located, it would be necessary to handle said structure and mirror twice. Not only when mounting the sensor on the structure of the mirror but also when installing the control and information systems associated with said sensors as well as the power supply means, when necessary. Likewise, different control systems require independent control units for each sensor that enable diagnosing the status of the sensor, making it necessary that these also be fixed to the reflector in some element thereof, typically on the supporting structure of the mirrors.

For example, Spanish patent ES2534037T3 and US patent application US2011000478 describe a heliostat on which a conventional mirror having two layers is installed and on which a camera is subsequently mounted on the rear face of said mirror. The heliostats contained in these documents present all the problems listed above but do not particularly describe mirrors with sensors that have been integrated during the manufacturing process of the mirrors prior to installing the mirror in a solar reflector but rather a heliostat with an already installed mirror on which a camera is mounted and there are no devices other than a camera. They refer to mirrors with two layers and not three layers such as those of the present invention, since it is necessary to place the camera behind the reflecting layer, and should there be a protective layer behind the reflecting layer, this would mean rupturing said protective layer consequently damaging the newly installed mirror, increasing the exposure of the interior layers and reducing their level of protection, which is neither practical nor is it safe. Furthermore, mounting the camera would be difficult requiring difficult calibration steps. Said documents do not describe a mirror with an integrated sensor, but rather an encapsulated camera mounted on the back of a mirror, with the consequent drawbacks derived from the handling of the camera on the mirror that is already installed in the heliostat, in addition to possible defects in said mounting and encapsulation, which can bring about less protection for the camera and lead to environmental problems that can cause deterioration such as abrasion (sand), exposure to ultraviolet light, saline surroundings, etc. The foregoing drawbacks are mainly due to the fact that, as already anticipated, implementing the systems described in said documents requires incorporating additional elements to the mirror during the installation in the field or the adjustment phase that require painstaking installation, alignment, mounting and commissioning processes, which must be performed in the field with limited means and under uncontrolled conditions that may affect the accuracy and functional nature of the systems. For example, aforementioned patent ES2534037 relates to the need to align the optical axis of a camera with the normal vector of the mirror perpendicular to the plane of the mirror, which must be performed after assembling the mirror in the heliostat, requiring tasks (deviation to be corrected in the calibration) and equipment (collecting and inserting machine) that are additional to the mere installation of the mirror on the heliostat, a tedious process with limited means resulting in high costs and poor quality.

Therefore, in order to solve the problems of the state of the art, a mirror has been developed which integrates at least one sensor into the body of the mirror itself, integrated during manufacture of the mirror itself and prior to supplying and installing the mirror in the reflector, provided with means of connection for transferring data between the sensor and a solar reflector control unit or even between the sensor and any other device in the field or solar plant comprising a processor as well as sensor power supply means. The means of connection and power supply are preferably also integrated in the body of the mirror rather than in the supporting structure thereof or in other elements of the solar reflector such that the solar control unit itself, connected with each of the mirrors on the solar reflector or any other processor whether integrated or not in the mirror, is capable of diagnosing the status of the mirror and additionally other elements of the solar field.

Furthermore, among all the mirrors that make up the reflector itself, the solar reflector can include a single mirror with at least one sensor associated with a processor that is also integrated in the body of the mirror; or several mirrors with at least one sensor each, only one of said sensors having a processor integrated in one of the mirrors; or various sensors in different mirrors and a processor associated therewith, which may or may not be integrated in one of the mirrors, whereby each mirror may therefore include one or more sensors.

SUMMARY

Therefore, the present invention proposes the development of a mirror, the only indispensable element of a reflector or solar concentrator, with the necessary sensors and/or devices integrated in order to endow it with intelligence and capacities of measurement, communication, etc., which are effective with the highest standards from the very moment of installation without having to install or incorporate foreign, additional or external elements to the mirror, which require the handling of the mirror after manufacture thereof and/or mounting of its components. This is so because the necessary components are integrated and adjusted in the production and manufacturing process, during the manufacture itself of the mirror, and always before supplying the mirror for installation thereof in the solar reflector or heliostat.

In particular, the invention relates to a sensorized mirror, i.e., a mirror with at least one sensor integrated in the body of the mirror, means of connection for data transfer and power supply means. The invention also relates to a smart mirror which is one that integrates an intelligent device, said intelligent device being determined by at least one sensor integrated in the body of the mirror, a processor also integrated in the body of the mirror (that can be incorporated in at least one sensor or associated therewith), means of communication or connection and power supply means. Preferably, not only the sensor and the processor are integrated in the body of the mirror, but the remaining components (means of connection and power supply means) are also integrated, i.e., all these components are integrated during the manufacturing or mounting of the mirror, prior to supplying for installation in the solar reflector, making up the components of the mirror itself, and such that they are at least partially arranged in and/or between one of the three layers (reflecting layer, first protective layer and second protective layer) that make up the mirror itself. Partially arranged should be understood as including at least one sensor, preferably with a processor, in and/or between the three layers of the mirror. The processor integrated in the body of the mirror enables processing the data received either from the sensor or sensors of the mirror, from other sensors of other mirrors, or from other processors located in other mirrors of the same solar reflector or processors of other devices, and sending the results of the processing of the data received through the means of connection of the mirror to another or other processors. This allows analyzing the information gathered by the different processors and enables the joint action of the mirrors, the solar reflectors of the solar field and, in general, all the devices that make up the solar plant. Furthermore, upon processing the received data, the processor can communicate with other sensors, such as actuators, or other devices, with the aim of transmitting commands to perform actions deemed necessary or to send information through said actuator sensors so that other devices can take the necessary measures on the basis of said gathered and analyzed information.

By integrating the at least one sensor or an intelligent device in the mirror, as proposed by the present invention, all the installation, mounting, commissioning and operation activities of the solar plants are simplified since all the technological complexity is already included in the mirror itself, i.e., when it is being manufactured, it is integrated prior to supplying the mirror for installation thereof in the reflector. The characteristics or capacities of the mirror object of the present invention are not only limited to measuring the variables derived from the integration of sensors but also to processing information, communicating with other similar or different devices and to managing control tasks that have thus far been managed by other elements arranged in the solar field or by the central control of the plant.

Specifically, the mirror object of the present invention i.e., the sensorized mirror, containing a sensor integrated in the body of the mirror, with means of connection or communication and power supply means, or the smart mirror or mirror with an intelligent device, which has a sensor and a processor integrated in the body of the mirror, in addition to the means of communication and power supply means, mainly due to the interaction of the sensor and/or the processor integrated in the mirror with other elements of the mirror itself, the solar reflector, the field or the solar plant, having some or all of the following capacities, provide:

The capacity to interact with the surroundings thereof, which includes collecting data from the surroundings by at least one sensor, managing the information acquired by the sensor and transmitting it, even including executive capacities such as operation and maintenance commands, among others.

The capacity to characterize its own status, which includes the capacity to verify the status of the mirror components in relation to the tasks for which they have been designed, such as level of soiling, optical quality, structural status, functionality, and operability based on the information collected by at least one sensor, as well as the possible processing and transmission of said information, including the executive capacity of resolving the detection of its own problems by itself, if it has the means, The capacity to identify and characterize the surroundings thereof, i.e., to identify and characterize reflectors located around the reflector which comprises the mirror with at least one sensor and/or one intelligent device, the supporting structure, the tracking system that actuates it, the receiver on which it reflects the radiation, to assess the meteorological conditions, carry out surveillance and safety tasks, among others;

The capacity to facilitate the identification and/or characterization of the mirror itself to third parties by means of the actuation of sensors, according to the present invention, such as actuators that emit acoustic or light signals (for example, the incorporation of LEDs), or by means of sensors, also according to the present invention, which act as active or passive references (for example, ArUco markers) by means of identifiable patterns, etc., that enable detection thereof, recognition and characterization by third parties;

The capacity to facilitate operations to other elements of the surroundings thereof by means of the interaction of the sensor and/or the processor integrated in the mirror with other elements of the solar field such as, for example, the solar reflector itself supporting the mirror, other reflectors, cameras or devices arranged in the solar field, independent of or included in the reflectors, for example, by means of sensors, according to the invention, which also act as passive references, such as identifiable patterns that enable the calibration of cameras or artificial vision devices or identifiable patterns (targets) on the surface of the mirror that enable the use of photogrammetry systems that define their geometry.

The capacity to analyze the information it collects and/or is collected by other mirrors with which it communicates and generate new information on the basis of the analysis of the dataset, and The capacity to assume management tasks of both the solar field and the plant in general.

According to the foregoing, the smart mirror, comprising an integrated intelligent device as described above, is a mirror that, in addition to the properties inherent to a mirror, has other properties that make it possible to for the mirror to "learn" through processing and management of the information gathered by the sensor or sensors integrated therein, as well as the information received and exchanged with the sensor or sensors of other mirrors arranged in reflectors of the same solar field, and even with other existing devices in the field or solar plant, such as, for example, the solar reflector control units or the central control unit of said solar plant or processors of mobile devices handled by operators or processors of devices located on board service vehicles of the plant.

Therefore, the present invention proposes, according to a first object of the invention, a mirror for a solar reflector.

Specifically, said mirror is made up in a first construction of a body with a reflecting layer, a first protective layer and at least one second protective layer and comprises at least one sensor integrated in the body of the mirror, means of connection for transferring data between the sensor and a solar reflector control unit and/or between the sensor and another processor in the solar field or plant, and sensor power supply means.

The term "integrated" should be understood as part of the body of the mirror, constituting a whole with the mirror, which can be contained partially or fully in the body of the mirror. It should also be understood as being included or integrated in the mirror during the manufacturing, assembling or mounting process of the components of the body of said mirror. In other words, for the purposes of the present specification, an integrated element implies that said element forms part of the mirror body itself such that said element may either be fully incorporated inside the body of the mirror or be incorporated only in part inside the body of the mirror, or be fixed to the body of the mirror such that it forms a joint whole that enables handling and installation thereof as a single element. The mirror with the integrated sensor is a result of the manufacturing, assembling or mounting process of the components of the body of the mirror, and more specifically, of a stage of integrating the sensor into the body of the mirror, which is prior to supplying the mirror for installation thereof in the solar reflector.

According to the state of the art, mirrors for solar reflectors mainly comprise three parts or layers that make up the body of the mirror, such as:

A reflecting layer carried out with a reflecting material, the function of which is to reflect the sunlight that impacts on the reflecting surface thereof.

A first protective layer, located in front of, above or on the reflecting surface and intended to protect said reflecting surface while allowing the light to reach the reflecting layer, for which purpose It must be transparent, thus enabling the solar rays to pass through to the reflecting surface, and A second protective layer located at the rear or below the reflecting layer, intended to protect said reflecting layer.

This protective layer may be a layer of paint or a resistant layer with a greater structural capacity than the layer of paint.

According to the usual configurations, at least one of the two protective layers must serve to support the assembly, for example, by means of a first protective layer of glass of sufficient thickness and a second protective layer of paint or by means of a first very thin transparent protective layer, even a transparent plastic sheet, and a second protective layer made up of a plate of different materials and a thickness that is sufficient to support the assembly of the body of the mirror. An alternative to the above consists in that the reflecting layer and the second protective layer make up a single layer, for example, when aluminum is used as a reflecting layer, wherein the aluminum itself acts as a second protective layer as well as a reflecting layer. Another alternative consists in that, in situations where the sensor is integrated in the second protective layer, specifically in an ulterior second protective layer, the first protective layer and the reflecting layer are part of a mirror that already includes first and second protective layers with a reflecting layer between the two, such that the resulting mirror comprises two second protective layers.

Based on the foregoing, the term integrated, for the purposes of the present description and as set out above, implies that the sensor, or a portion thereof, is located at any point of the body of the mirror, specifically between the first protective layer and at least one second protective layer.

The invention therefore proposes, in the first place, a mirror for a solar reflector comprising at least one sensor integrated in the mirror itself, said sensor being integrated in the mirror during the manufacturing process thereof or during the assembly or mounting of the body of the mirror, prior to supplying the mirror for installation or mounting thereof in the reflector. Thus, after the manufacturing process, a mirror with an integrated sensor is obtained, which may already be referenced with respect to the reflecting surface of said mirror, so that after installation thereof in the solar reflector it will be sufficient to place the mirror correctly and connect the means of connection of the sensor for transferring data between the sensor itself and the solar reflector control unit where the mirror is located and/or between the sensor and another processor of the solar field or plant. The means of connection of the sensor, as well as the power supply means, may be wired or wireless. The actual connections of these means of connection and power supply would be integrated in the mirror as they are part of the sensor itself, but, in the case of wired means, the wiring does not have to be integrated in the mirror.

Based on the foregoing, it should be pointed out that in the present description the means of connection of the sensor for transferring data between the sensor itself and the solar reflector control unit as well as the power supply means refer to:

Wired and wireless means,
The wiring of the means of connection and/or the power supply means, in the case of wired means,
The connectors of said means of connection and/or the power supply means, in the case of wired means, and/or
The emitters in the case of wireless means.

Contrary to what happens in the state of the art, it will be possible to avoid placing and even referencing the sensor with respect to the reflecting surface since, when the sensors are integrated in the mirror, said actions can be carried out during manufacture and/or assembly of the mirror.

Similarly, the sensor or sensors integrated in the mirror could sometimes facilitate both the mounting operations and commissioning of the solar reflector, for example, by facilitating information during mounting, positioning or installation, and even monitoring the transport stages thereof.

Therefore, as mentioned, and given that the function of a solar reflector is reflecting light in a certain direction, it will be very useful that the sensors, and especially those that are used to define the orientation of the mirror itself, be jointly integrated with the mirror. It will also be very useful for these sensors to be integrated into the mirror during the manufacturing and/or assembly process as this will enable defining the position and orientation thereof with respect to the reflecting surface during the manufacturing and/or assembly process itself, where it can be defined in a more reliable, systematized and economic manner. This way, the relative position of the sensor and the reflecting surface is known and invariable as of the manufacturing process thereof.

The mirror object of the present invention therefore comprises at least one sensor, which is joint and inseparable from the body of the mirror and which therefore makes up a further component of the mirror, integrated in the body thereof, just like the layers that make up the body thereof.

The sensor integrated in the mirror can be of different types, for example:

A camera or artificial vision device, which captures images and sends them to the solar reflector control unit and/or to another processor of the solar field or plant through the means of connection. Said camera may comprise a processor for processing the captured images and sending only the relevant information by reducing connectivity requirements, or A mirror breakage sensor, for example, of the type comprising a conductive element in any of the layers of the mirror, for example, by silkscreen or wire.

Other sensor alternatives may be, for example, those that determine the level of dirt on the mirror, and/or measure the tilt of the mirror, and/or measure the orientation of the mirror, and/or measure atmospheric or meteorological conditions (wind, passing clouds . . . ) and/or detect the position of the sun, and/or measure the geometrical quality of the mirror, and/or identify the mirror for monitoring and control thereof, and/or measure the temperature, and/or measure the position of the mirror, and/or measure vibration levels, and/or carry out safety and surveillance operations. In any event, the sensor, which is to be integrated in the body of the mirror, will be selected according to the needs required by the application thereof.

Additionally, as mentioned in the previous paragraph, for the purposes of the present application, sensors must also be understood as those elements or devices that identify the mirror for monitoring and control thereof and which may be active or passive elements. In the case of active elements, these facilitate operations of other mirrors installed in the same field, of the operator or of other field devices such as parabolic trough reflector receivers or monitoring systems such as concentrated solar flux measuring systems in tower plants. Examples of these active elements or actuators include those that emit acoustic signals, light signals, vibratory signals, etc. These elements or devices may allow additional operations such as lighting areas near the reflector, deterring animals (particularly birds), etc. On the other hand, for the purposes of this application, passive elements or devices are also sensors, which can facilitate geometrical verifications, the calibration of vision devices, etc. Said passive elements may be encoded targets, geometrical patterns or any other element that facilitates these tasks due to their uniqueness (calibration of cameras, measurement through photogrammetry techniques, etc.).

The mirror with a sensor or sensors integrated in the mirror can incorporate a processor, whether or not included in the sensor itself, which endows it with a capacity to calculate and process the data acquired by the sensor. The processor may therefore be incorporated in the sensor and alternatively the processor may be integrated in the body of the mirror, associated with the sensor but independent thereof. In any event, a single processor integrated in a mirror, whether or not included in the sensor, may be connected or associated with all the sensors arranged in a same mirror, or even with sensors of other mirrors arranged in the same or another reflector, or with processors arranged in mirrors arranged in the same or another reflector, or with processors arranged in any device of the solar field or plant, such as for example, the processor of a solar reflector control unit, the processor of an intelligent device that is handled by an operator or that is on board a plant service vehicle, the central control unit of the plant, etc. This association of sensor and processor integrated in the body of a same mirror gives rise to the smart device together with the transmission and power supply means. Said smart device integrated in a mirror gives rise to an intelligent mirror or smart mirror.

With respect to the means of connection of the sensor integrated in the mirror and the power supply means thereof, any of the options available in the state of the art may be used, as mentioned. For example, the means of connection may or may not be wireless and in the latter case, preferably selected from among IEEE 802.15.4 (ZigBee), Wireless Hart or Bluetooth Low Energy—BLE or others that may arise in the future. Similarly, with respect to the power supply of the sensor, they may or may not also be wireless, as well as being constituted by a photovoltaic cell, said photovoltaic cell being able to include a battery or any other type of energy storage device associated with said cell. On the other hand, the sensor power supply means may be a battery integrated in the mirror or any other type of energy storage device.

In summary, the sensor can be any sensor that enables the mirror to carry out functions additional to reflection, such as those described above and may incorporate those elements necessary for the proper operation thereof and performance of the functions thereof, either in the sensor itself and integrated in the body of the mirror, or associated with the sensor but not integrated in the body of the mirror. These elements would mainly consist of the sensor accessories necessary for the operation thereof, such as the means of connection and the power supply means. When we refer to a sensor in the present description, it must be understood that we are referring to a sensor and the components necessary for the proper operation thereof. Furthermore, when we refer to a smart device in the present description, it must be understood that we refer to at least one sensor of any of the types mentioned above together with a processor and the components necessary for the operation thereof.

The options for integrating the sensor into the body of the mirror are varied and depend to a large extent on the topology and composition of the layers of the body of the mirror, since, depending on the composition of said layers, the sensor can be integrated in one or more of them. Likewise, it will also depend on the sensor and the functions or requirements thereof, since depending on these, the sensor must be located on the reflecting layer or it may be located through said reflecting layer or it may be located behind said reflecting layer or located behind said reflecting layer but with access to the first protective layer located in front of the reflecting layer, for example, to be able to view through it.

For example, the sensor may be located above the reflecting surface at any point thereof, such that the first protective layer comprises a gap or space for integrating the sensor therein. Another alternative consists in that the first protective layer is machined and comprises a housing in which the sensor is integrated, whereby the sensor is located above the reflecting layer.

Another option is that in one construction the sensor be integrated into the rear of the mirror, such that the sensor crosses the body of the mirror from the second protective layer until it reaches the reflecting surface or is next to it. In another construction, the sensor passes through the second protective layer leaving one part of the sensor outside the body of the mirror. In other words, in the second alternative, the second protective layer also surrounds the integrated sensor while one part of the sensor is kept outside the body of the mirror, facilitating, for example, the connection and/or power supply of the sensor, and in the first alternative, the integrated sensor is located totally inside the second protective layer of the body of the mirror. In these two constructions, it may be of interest, depending on the implementation of the sensor, to create a discontinuity in an area of the reflecting layer to enable the sensor to be in contact with the first transparent protective layer in order, for example, to view through it. A discontinuity is equivalent to a space, area or section of the reflecting layer, which does not have reflecting material, in order to thus enable the sensor to carry out its function through that discontinuity.

As mentioned above, the different alternatives will depend on the topology and composition of the layers of the body as well as on the sensor to be integrated into said body.

For the purposes of the present description, the materials that make up the different layers of the body of the mirror may be any that ensure the functionality of the mirror, i.e., a suitable level of reflection, and which enable integrating the sensor into said body, and some examples of these are:

First supportive layer: glass preferably solar glass with high transmittance (low iron content) whether curved or flat, and it may or may not be tempered. As an alternative a low thickness transparent protective coating (for example, $SiO_2$), transparent plastics or the like, may be used.

Reflecting layer: preferably silver or aluminum, although there may be other reflecting materials that can be used.

Second supportive layer: Paints, plastics, composite materials, sandwich panels, glass, foam-filled carcasses of different materials, metallic surfaces (for example, aluminum) . . . .

Furthermore, a mirror can integrate one or several sensors with the same or different function depending on the applications of the mirror, the design of the solar installation and/or the needs thereof. The mirror may also be upside down in its working position or even vertical, so the foregoing term "above" should be understood as on the side of the reflecting layer on which solar radiation impacts when the mirror is in operation. Similarly, when terms such as "under" or "below" are used with regard to the position of the sensor with respect to the reflecting layer, it must be understood as the shaded side of the reflecting layer when the mirror is in operation, opposite to the side on which the radiation impacts.

When the mirror also integrates a processor and it is not incorporated in the sensor, the processor can be integrated in the body of the mirror according to one of the options described above for the sensor.

Therefore, based on the foregoing characteristics, the mirror with at least one integrated sensor, power supply and transmission means and preferably a processor, which can be a part of the sensor or independent of it, but integrated in the mirror, can have different capacities depending on the sensors that the mirror incorporates, such as:

The capacity to interact with the surroundings of the mirror, and/or

The capacity to characterize its own status, and/or

The capacity to identify and characterize the status of the elements that surround it, the elements with which it is integrated, the surroundings thereof or any other element, and/or The capacity to provide relevant information to third parties, and/or The capacity to facilitate operations to other elements of the surroundings thereof, and/or The capacity to analyze information it collects and/or is collected by other mirrors with which it communicates and generate new information on the basis of the analysis of the dataset, and/or The capacity to assume management tasks of both the solar field and the plant in general.

A second object of the invention is a method for assembling a mirror for a solar reflector.

Said method consists of including a stage for integrating a sensor into the body of the mirror itself during the manufacturing and/or assembly process of the layers that make up the body of the mirror, a stage which is prior to supplying the mirror for installation thereof in the solar reflector. Specifically, the method for assembling a mirror for solar reflector, being the type wherein the body of the mirror has at least one reflecting layer, a first transparent protective layer and at least one second protective layer and comprising an integration stage in which at least one sensor is located in contact with at least one of the three layers that will make up the mirror after the assembly process, and a subsequent stage in which said at least one sensor is covered with at least one of the protective layers, the sensor being integrated between said protective layers. Therefore, in said integration stage, at least one sensor is located either above, below or passing through the reflecting layer, and in a subsequent stage, said at least one sensor is covered with a protective layer, which may be either the first protective layer or the second protective layer depending on which side of the reflecting layer the sensor is located, such that said at least one sensor is integrated in the body of the mirror. The terms "above" and "below" imply that the sensor may or may not be in contact with the reflecting layer, i.e., the sensor may be located at a distance from said reflecting layer, on either side of the reflecting layer, or in contact with either of said two faces of said reflecting layer. If the method requires it, the sensor can also be integrated in several layers of the mirror and not only one of them, including the reflecting layer.

The foregoing stages may comprise or further imply other additional stages. For example, in order for the sensor to be above the reflecting layer, the integrating stage may comprise creating a housing in the first transparent protective layer and locating the sensor in said housing, and in a subsequent stage, applying the reflecting layer on said first protective layer and thereafter arranging the second protective layer under or below the reflecting layer. Alternatively, the reflecting layer can be applied on the second protective layer prior to joining these with the first protective layer.

In another alternative, as an integration stage, a housing is created in the second protective layer and the sensor is located therein, and in a subsequent stage, the reflecting layer is applied on said second protective layer and thereafter the first protective layer is arranged on the reflecting layer. Alternatively, the reflecting layer can be applied on the first protective layer prior to joining these with the second protective layer.

Alternatively, in the integration stage, a housing is created in a second ulterior protective layer and the sensor is located in said housing, and then a mirror, comprising three layers thereof, i.e., the second protective layer thereof with the reflecting layer and the first protective layer, is arranged on said second ulterior protective layer. In other words, a housing is created in a second protective layer and a mirror with three layers thereof is located on said second protective layer.

In certain constructions where the sensor is located between the reflecting layer and the second protective layer, specifically in those where the sensor must have direct vision through the first protective layer, a discontinuity must be created in an area of the reflecting layer in order to allow the sensor to face the first transparent protective layer.

At least one layer of paint can be applied for arranging the second protective layer behind the reflecting layer.

Similarly, and since the mirror has means of connection associated for transferring data between the sensor and a solar reflector control unit and/or between the sensor and another processor of the solar field or plant, as well as sensor power supply means, said means, which may be wired or wireless, are also positioned during the stage when the sensor is integrated into the mirror. The same applies to the integration of the processor in the body of the mirror when the processor is not part of the sensor, i.e., the integration stages of said processor in the body of the mirror are the same as those described above for the integration of the sensor in the body of the mirror, giving rise to an intelligent mirror or smart mirror.

Another object of the invention is a solar reflector, comprising at least one mirror, object of the present invention.

A fourth object of the invention is a mirror interaction and management system for solar reflectors wherein at least one mirror with at least one integrated sensor, arranged in a solar reflector, is connected with at least one processor external to the mirror. Specifically, the system comprises at least one reflector with at least one mirror such as the one that is object of the present invention, namely a mirror with at least one integrated sensor, transmission and power supply means, and preferably also including a processor, and at least one processor external to the mirror, such that the sensor integrated in the mirror and the external processor are connected to each other by means of connection for transmitting and/or exchanging data and information between the mirror and the external processor and/or between the external processor and the mirror. The system is configured to, at least:

Generate information of interest including signals (which can be light, acoustic or otherwise) for other components of the solar plant or field including intelligent mirrors or smart mirrors, and/or Collect information on itself and on the surroundings thereof, and/or Exchange the collected information among the processors, and/or Analyze the collected information, and/or Generate information based on the available information, and/or Transmit the new information that has been collected, exchanged or generated, and/or Generate and/or receive instructions for itself or for other components of the solar field or plant.

Mirrors for solar reflectors are of the type described above and, specifically, are made up of a body with a reflecting layer, a first transparent protective layer, and at least a second protective layer characterized in that it comprises at least one sensor integrated in the body of the mirror, in a manufacturing stage of the mirror itself prior to supplying the mirror for installation thereof in the solar reflector, said sensor forming part of the body of said mirror being partially arranged in and/or between certain layers thereof; means of connection for transferring data between the sensor and a solar reflector control unit; sensor power supply means. Preferably, it will also include a processor integrated in the body of the mirror either incorporated to the sensor or external to the sensor but always associated thereto and integrated in the body of the mirror.

Each solar reflector has at least one mirror, although it may have more than one. Preferably, all the reflectors in the solar field will incorporate a sensorized or smart mirror, although it is possible that on certain occasions reflectors without sensorized or smart mirrors may be arranged. In these cases, the sensorized or smart mirrors can transmit the information to, for example, the central control unit or they can even be connected to the control unit of those reflectors that do not have sensorized or smart mirrors in order to transmit instructions or information. For example, in order to measure the dirt on mirrors in a solar power plant it would suffice for the sensor to be integrated into one of the mirrors of different reflectors such that not all reflectors comprise a mirror with a sensor for measuring dirt but only a representative number of reflectors would comprise a mirror with said sensor. Thus, the information collected by the sensors can be extrapolated to all mirrors with or without a dirt sensor.

A "smart field" according to the present invention therefore comprises, as mentioned above, at least one solar reflector with at least one mirror with a sensor, transmission and power supply means, all of them integrated in the mirror and connected with at least one processor external to the solar reflector and belonging to any device arranged in the solar field, such as an intelligent device handled by an operator or a device located on board a solar plant vehicle, a central control unit, a reflector control unit, another smart mirror of another solar reflector, etc. Said mirror is connected directly or indirectly with at least said external processor. Preferably, the aforementioned mirror incorporates an integrated processor during the manufacturing process prior to supplying the mirror for the installation thereof in the reflector, giving rise to the so-called intelligent mirror or smart mirror, which processor can connect with the processor external to the solar reflector. The mirror may indirectly be connected to the external processor through a processor located in the solar reflector, said processor preferably belonging to the control unit of the reflector. During the connection of the mirror with the external processor, the information generated by the mirror, based on the measured and/or calculated information, may or may not be processed, handled or modified by an intermediate processor that will subsequently send this information to the external processor.

The mirror interaction and management system for solar reflectors object of the present invention enables connection between several mirrors that can belong to the same solar reflector and/or to different reflectors located in the same solar field of plant, said solar field or plant comprising a central control unit of the reflector field or plant, which is independent of the processors integrated in the mirrors, although it is possible that the processor of one of the mirrors carry out all or a part of the functions of the central control system of the field or plant. The system enables the exchange of information between the elements of the system, at least one mirror with an integrated sensor and a processor external to said at least one mirror, in order to thus analyze the information collected or generated by the different components, preferably the mirrors.

Therefore, because of the connection between the components of the smart plant or the mirror interaction and management system, as well as the information exchanged between the different mirrors with or without processors, based on the information collected, gathered or emitted by the sensors of the mirrors or supplied by the central control unit or the processors in devices other than the mirrors, the learning and logical reasoning capacities of the plant processors and each mirror, when they integrate them, as well as the assembly of mirrors, are enhanced, increasing the capacities of the different components and generating new capacities.

This capacity to exchange and analyze information with other components and systems of the solar field results in additional capacities because, among other things, it enables generating additional information based on the aggregated analysis of information from several mirrors. An example is the position measurement of two mirrors that make up the collector of the same reflector, since by sharing the position information of both mirrors, the slope of the collector is automatically calculated, which is additional data that is not measured by either of them, and this is achieved because, based on the surroundings information gathered by the processor and referring to the position of a point in each mirror, said information is exchanged between the processors, it is analyzed, and new information is generated such as the definition of the straight line that joins both mirrors in order to thus execute operations such as knowing the tilt angle of said collector.

By means of the foregoing, it is possible that when a group of smart mirrors, object of the invention, work as a cluster or as a whole, they increment their capacity to generate information of interest. Moreover, when all or a relevant number of reflectors in the solar field or plant include mirrors such as those that are object of the present invention, the system has a large amount of information relevant to the management of said solar field converting it into what can be called an intelligent field or a smart field. In these fields, it is possible to have greater and more automatic knowledge on the status of the elements that make it up, which enables taking more informed decisions on the optimal way of operating and maintaining the field. Furthermore, smart mirrors will be able to manage more information and even take on operations that were previously carried out by central controls of the plant or the local controls of the receiver, reducing central control requirements and communication needs, so that the system moves from a centralized to a more distributed control.

Among other things, this facilitates the implementation of the concept known as autonomous heliostats and, in general, of non-wired reflectors, which allows a significant reduction of plant costs.

BRIEF DESCRIPTION OF THE DRAWINGS

The foregoing and other advantages and characteristics will be more fully understood on the basis of the following detailed description of the embodiments, with reference to the attached drawings, which should be considered by way of illustration and not limitation, wherein.

DETAILED DESCRIPTION

Some of the preferred embodiments of the invention will now be described with reference to the figures that accompany the present description.

Figure 1:
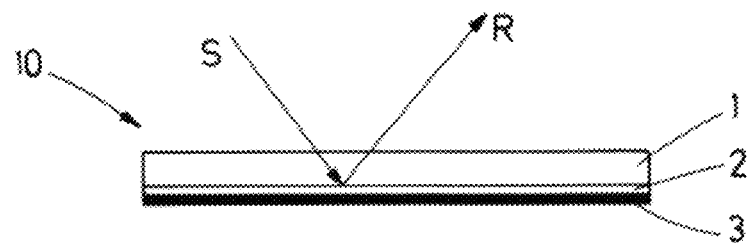
FIG. 1 shows an example of the mirror for a solar reflector according to the state of the art.

Thus, FIG. 1 shows a mirror 10 for the solar reflector of the state of the art, which does not integrate a sensor 4 in the body of the mirror 10. The body of the mirror 10 comprises three layers, a first upper and transparent protective layer 1, a reflecting layer 2, having a surface made of a reflecting material, located below the first layer, and a second lower protective layer 3 located below the reflecting layer 2. The solar rays S impact on the surface of the reflecting surface 2 passing through the first protective layer 1, which must be transparent, and reflects said rays R. If a sensor 4 has to be placed in one of these mirrors 10, or in the solar reflector in which it is installed, in order to know at any time or periodically the status and/or the relevant parameters of the mirror or other characteristics of the reflector or the reflector assembly and systems that are installed on the site and constitute a solar field, its components or the surroundings, a sensor must be associated to the mirror 10 or to another element of the solar reflector in order for said sensor to provide the required information. This additional operation must be carried out during the mounting and commissioning process of the solar reflector or after installation thereof in the field. After this operation, it will be necessary to subject the solar reflector and/or mirror 10 to different checks that imply a cost in time and resources, especially when they are carried out after installation thereof in the field.

In order to avoid these additional tasks, the mirror 20, object of the present invention, comprises a sensor 4 integrated in the body of the mirror 20 itself. Said integration can be carried out in different ways during the method for assembling the different layers of the body of the mirror 20, such that the sensor 4 becomes part of the body of the mirror 20 itself. Thus a great number of operations are avoided since the sensor 4 is already installed and may have been referenced from the time of its assembly in the factory with respect to the reflecting surface of the mirror 20. Once the mirror 20 is installed on the solar reflector, it will suffice to connect the preferably wireless transmission means of the sensor 4 to the solar reflector control unit. Furthermore, it will also be necessary to connect the power supply means to the sensor 4 when these are not also integrated in the body of the mirror 20 itself, for example a battery, or when these are not wireless.

Figure 2:
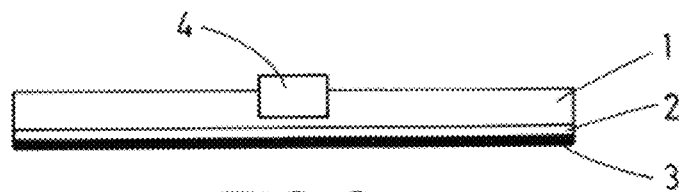
FIG. 2 shows a side view of a first embodiment of a mirror with an integrated sensor.

FIG. 2 shows an example of a mirror 20 with a second protective layer 3 made up of, for example, one or more layers of paint, a reflecting layer 2 and a first transparent protective layer 1 of, for example, 4 mm glass. The protective layer 1 provides the mirror 20 with mechanical rigidity, although said rigidity is reinforced once the mirror 20 is installed on the supporting structure of the solar reflector on which the mirror 20 is placed. In this case, the first protective layer 1 carries out the supporting layer functions for the body of the mirror 20 and enables integrating the sensor 4 inside said first protective layer 1. To this end, the sensor 4 is arranged above the reflecting surface or layer 2, at any point thereof, the first protective layer 1 comprising a gap or housing for integrating the sensor 4 therein.

As mentioned above, the sensor 4 may be inserted into a gap created in the first layer 1, such that the sensor 4 is in contact with the exterior, and it can have a thickness greater or lesser than that of the first layer 1, as shown in FIG. 2.

Figure 3:
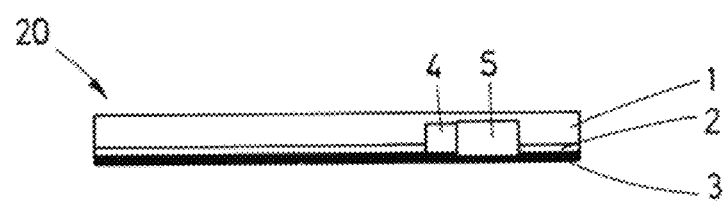
FIG. 3 shows a side view of a second embodiment of a mirror with an integrated sensor.

An integration alternative for a mirror 20, of the type that is integrated in the first protective layer 1, as in foregoing FIG. 2, is shown in FIG. 3, and consists in machining a housing in the first protective layer 1 and integrating the sensor 4 inside said housing, either between the first protective layer 1 and the reflecting surface 2 or between the first protective layer 1 and the second protective layer. In this example, a module 5 is shown next to the sensor 4, which represents the means of connection for the transmission of data with the central unit of the solar reflector and/or the sensor 4 power supply means.

The manufacturing process of the examples shown in FIGS. 2 and 3 comprises at least one stage for integrating the sensor 4 in the body itself of the mirror. Specifically, it comprises a stage in which at least one sensor 4 is placed above the reflecting layer 2, covering said at least one sensor with a first protective layer 1. In the examples of FIGS. 2 and 3, said sensor is covered with a first transparent protective layer 1. In FIG. 2, the sensor 4 is above the reflecting layer 2 while in FIG. 3 it is above and in contact with the reflecting layer 2.

Particularly, starting from a first protective layer 1, which acts as a load-bearing element or element that confers rigidity to the transparent mirror assembly, such as for example a 4 mm solar glass sheet, housings are prepared therein, preferably by means of machining, enabling the insertion of the selected sensor 4 or sensors and the auxiliary elements, such as means of connection and power supply means, necessary for the proper operation thereof. For example, a mirror assembly and/or manufacturing process would consist of:

- Carrying out housing in the solar glass sheet 1 that acts as a first protective layer 1,
- Tempering and/or curving the glass sheet 1, if deemed necessary for the application, since not all manufacturers temper glass and not all mirrors are curved but it may be common in some applications,
- Placing and fixing the sensors 4 and auxiliary elements 5 in the housings carried out in the glass sheet 1,
- Arranging the reflecting layer 2 usually by means of the deposition of a layer of silver, and
- Applying at least one second protective layer 3 after the reflecting layer 2, said second protective layer 3 being able to be comprised by the application of at least one layer of paint.

Figure 4:
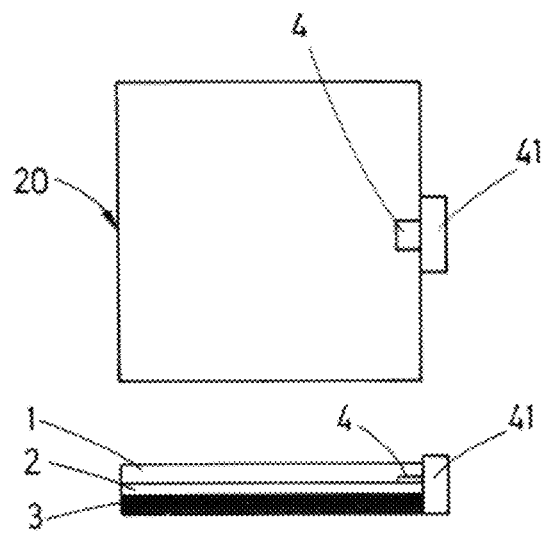
FIG. 4 shows a plan view and a side view of a third embodiment of a mirror with an integrated sensor.

FIG. 4 shows an example in which the sensor 4 together with a camera 41, or artificial vision device, are laterally integrated in a mirror 20, such that the sensor 4 is fully integrated in the mirror 20 but the camera 41 remains outside the mirror 20, such that the sensor assembly 4, 41 is semi or partially integrated in the mirror 20. This semi-integration solution or partial integration of sensors in the body of the mirror 20 in which parts of the sensor 4 are inside the mirror 20 and other parts are outside it, represents a solution for those cases in which the dimensions of sensor parts do not allow full and total integration thereof in the body of the mirror 20.

It is advisable that in the above situations in which the sensor 4 is located above the reflecting layer 2, said sensor 4 shades the smallest possible surface area of said reflecting layer 2 in order to avoid reducing the reflecting surface and therefore maintain mirror performance or solar reflection as high as possible.

The manufacture and/or assembly process of the example shown in FIG. 4 is similar to the methods shown in previous examples and comprises as differentiated stages:

- The housing of the first protective layer 1 is carried out on one side of the perimeter of said protective layer 1,
- The sensor 4, is housed in said housing of the first protective layer 1,
- Placing and fixing the sensor 4 and eventually the necessary auxiliary elements 5, which will be accessible from the side of the mirror 20,
- Arranging the reflecting layer 2 usually by means of the deposition of a layer of silver,
- Applying at least one second protective layer 3 after the reflecting layer 2, said second protective layer 3 being able to be comprised by the application of at least one layer of paint.
- Placing and fixing a second sensor 41, in this example a camera 41, which is located outside the body of the mirror 20 but connected to the sensor 4 and/or the auxiliary elements of both, which are accessible from the side of the mirror 20, and
- Protecting the sensors 4 and 41 as well as the auxiliary elements by means of a sealant.

Figure 5:
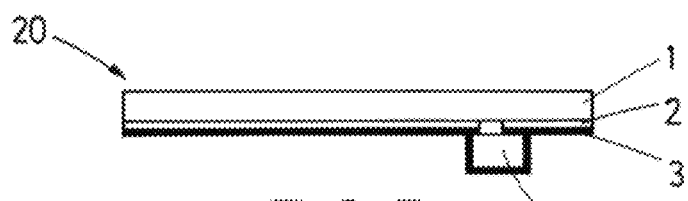
FIG. 5 shows a side view of a fifth embodiment of a mirror with an integrated sensor.

FIG. 5 shows an example in which the sensor 4 is integrated in the body of the mirror 20 from the back of the reflecting layer 2, such that the sensor 4 is integrated by being located between said reflecting layer 2 and the second protective layer 3. In this solution, the first protective layer 1 continues to carry out supporting layer functions of the mirror 20. The sensor 4 may or may not pass through the reflecting layer 2 depending on its functions. In the shown example, the sensor 4 is a CCD sensor, like the one used in digital cameras, which must have access to the front of the mirror 20, so the reflecting layer 2 has a discontinuity in an area of the reflecting layer such that the sensor 4 faces the first transparent protective layer through said discontinuity. In this example, and after having integrated the sensor 4 with the first layer 1, which protects it and applying the reflecting layer 2 of the mirror, the second protective layer 3 is applied, which protects the back of the reflecting layer 2 and the sensor 4. This second protective layer 3 is preferably a paint applied in one or several layers.

For example, a mirror assembly and/or manufacturing process according to example 5 would consist of:

- Arranging a reflecting layer 2 on a first protective layer 1 of solar glass preferably, for example, 4 mm thick, which acts as a supporting layer of the mirror 20. If, necessary, the first protective glass layer is subjected to tempering and/or curving prior to arranging the reflecting layer 2. The reflecting layer 2 may be a deposition of a silver layer. Similarly, if necessary because the sensor requires a front view through the first protective layer 1, said reflecting layer 2 comprises a discontinuity in its area in order to allow the sensor 4 to face the first transparent protective layer 1.
- Placing and fixing the sensors 4 and auxiliary elements 5 on the back surface of the reflecting layer 2, and
- Applying at least one second protective layer 3 following the reflecting layer 2, this second protective layer 3 being able to be formed by the application of at least one layer of paint that covers and protects both the reflecting layer 2, the sensor and the auxiliary elements. Alternatively, the first glass protective layer 1 and the reflecting layer 2 can themselves make up a solar mirror also including an ulterior second protective layer, such that these three layers make up a single installation element, with the reflecting layer 2 and the ulterior second protective layer containing the aforementioned discontinuity, if necessary.

Figure 6:
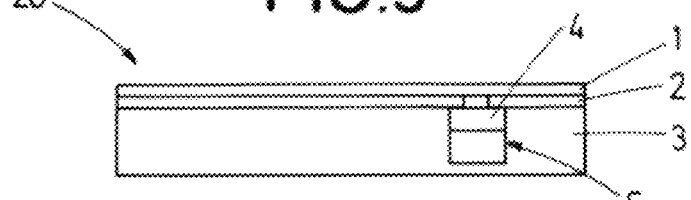
FIG. 6 shows a side view of a sixth embodiment of a mirror with an integrated sensor.

FIG. 6 shows an example of a mirror with a first transparent protective layer 1 of a lesser thickness than those shown previously and preferably also of glass, a reflecting layer 2 and a second protective layer 3 of a thickness that is sufficient in order to provide mechanical rigidity to the mirror 20. As in the previous example, the sensor 4 is integrated in the body of the mirror 20 from the back of the reflecting layer 2, such that the sensor 4 is integrated by being located between said reflecting layer 2 and the second protective layer 3. The second protective layer 3, which carries out the functions of being a supporting layer for the mirror 20, is, for example, a casing with foam or honeycomb therein. In this embodiment, which is not exclusive of first protective layers 1, with a small thickness, for example 2 mm glass or less, the sensor 4 is fully integrated in the second protective layer 3, such that the sensor 4 is fully integrated and embedded therein. As in the previous example, the reflecting layer 2 has a discontinuity in order to allow viewing through it. The sensor is protected by the first transparent protective layer 1 and by the second protective layer 3. Similarly, in this example, the sensor 4 includes a module 5, which represents the means of connection for the transmission of data with the central unit of the solar reflector and/or the sensor 4 power supply means.

For example, a mirror assembly and/or manufacturing process according to example 6 would consist of:

Arranging a reflecting layer 2 on a first protective layer 1 of solar glass preferably, for example, 2 mm thick. If, necessary, the first protective glass layer is subjected to tempering and/or curving prior to arranging the reflecting layer 2. The reflecting layer 2 may be a deposition of a silver layer. Similarly, if necessary because the sensor requires a front view through the first protective layer 1, said reflecting layer 2 comprises a discontinuity in its area in order to allow the sensor 4 to face the first transparent protective layer 1.

Placing and fixing the sensors 4 and auxiliary elements 5 on the back surface of the reflecting layer 2, Placing a casing, which makes up part of the second protective layer 3, on the back of the reflecting layer 2, covering the sensor 4, the auxiliary elements 5 and said reflecting layer 2, so as to maintain an empty space between the reflecting layer 2 and the casing, and Filling said space with a low-density foam that allows the second supporting layer 3 to act as a supporting layer of the mirror 20, once it has hardened.

Figure 7:
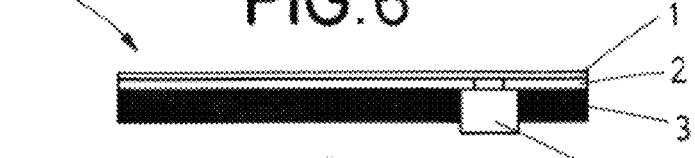
FIG. 7 shows a side view of a seventh embodiment of a mirror with an integrated sensor.
Figure 8:
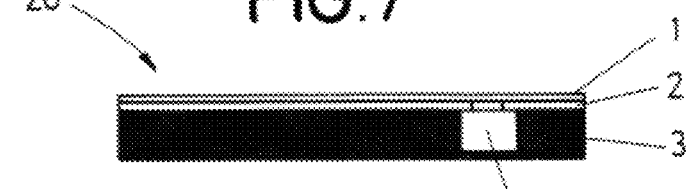
FIG. 8 shows a side view of an eighth embodiment of a mirror with an integrated sensor.

As in the last two examples, FIGS. 7 and 8 refer to mirrors 20 that comprise a sensor located between the second protective layer 3 and the reflecting layer 2, the sensor 4 passing through the reflecting layer 2. Similarly, the first transparent protective layer 1 may be thinner than in the previous cases, for example 1 mm glass or simply a protective coating or an adhesive sheet, which may even incorporate the reflecting layer 2, which adheres on the second protective layer 3, which obviously on this occasion also acts as a supporting layer that provides the necessary rigidity to the mirror assembly 20. In these examples, the sensor 4 can be integrated in the body of the mirror 20 and more particularly, in the second protective surface 3, either semi or partially integrated, as in FIG. 7, in which the sensor protrudes slightly from the second protective layer 3, or it can be fully integrated, as in FIG. 8, in which the sensor 4 is totally embedded in said second layer 3.

For example, a mirror assembly and/or manufacturing process having the characteristics shown in FIGS. 7 and 8 would consist of:

Carrying out housings in a second protective layer 3, which acts as a supporting element of the mirror 20 and which may be plastics, composite materials, sandwich panels, and glass, among others.

Placing and fixing the sensors 4 and auxiliary elements 5 in the housings that have been created in the second protective layer 3, Applying and fixing a second reflecting layer 2. When the sensor requires a front view through the first protective layer 1, and is therefore facing it, the reflecting layer 2 comprises a discontinuity in its area in order to allow the sensor 4 to face the first transparent protective layer 1.

Placing and fixing a thin sheet of glass, for example 1 mm, on the reflecting layer 2.

Alternatively, a solar mirror, which comprises as a single element at least one transparent glass as the first protective layer 1 and a reflecting layer 2 may be arranged on the second protective layer 3, said reflecting layer 2 having the mentioned discontinuity, if necessary, and it may also include its own additional second protective layer 3. This alternative is a common construction since the reflecting surface to be included will already comprise the second protective layer thereof, usually paint, whereby somehow the second protective layer 3 is doubled or is divided into a second protective layer 3, which is included with the reflecting layer and an ulterior second protective layer on which the mirror is installed and in which the sensor is integrated.

Another alternative consists in a reflecting sheet, preferably a self-adhesive sheet, comprising a reflecting layer with a transparent sheet as first protective layer and a second protective layer, which would serve to fix the reflecting sheet on an ulterior second protective sheet.

Figure 9:
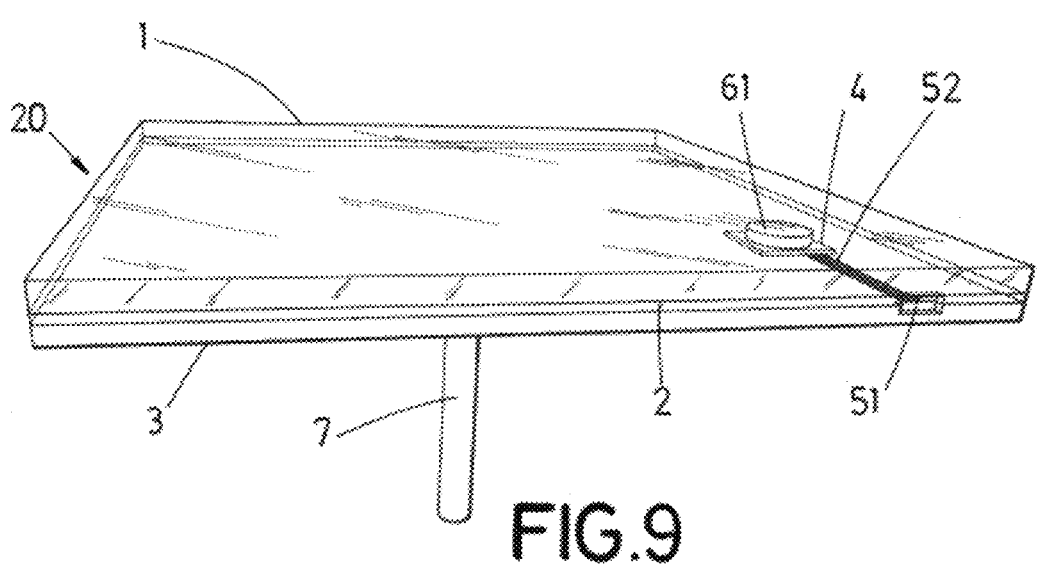
FIG. 9 shows a perspective view of a single faceted heliostat with a mirror on a supporting structure according to another embodiment of the invention.

FIG. 9 shows an example in perspective of a mirror 20 installed on a supporting structure 7 of a solar reflector, in this case a single faceted heliostat, with a single mirror. Said mirror 20 comprises a first transparent protective layer 1, a reflecting layer 2 and a second protective layer 3. In this example, the first protective layer 1 carries out the functions of a supporting layer, although the second protective layer 3 may also carry out these functions. An optical sensor 4 with a lens 61 is arranged between the first layer 1 and the reflecting layer 2, integrated in the body of the mirror 20 and covered by the first layer 1. The means of connection and the power supply means, specifically the wiring 52, are also integrated in the body of the mirror 20 and end in a connector 52 located on the edge of the mirror. Thus, once the mirror 20 has been manufactured with the sensor 4, lens 61, as well as the means of connection and the power supply means 52 integrated in its body and following the subsequent installation thereof in the supporting structure, it will suffice to connect the same to the central control unit through the connector 51 in order to provide the sensor with power supply and connection capacity, facilitating the installation of the mirror.

Figure 10:
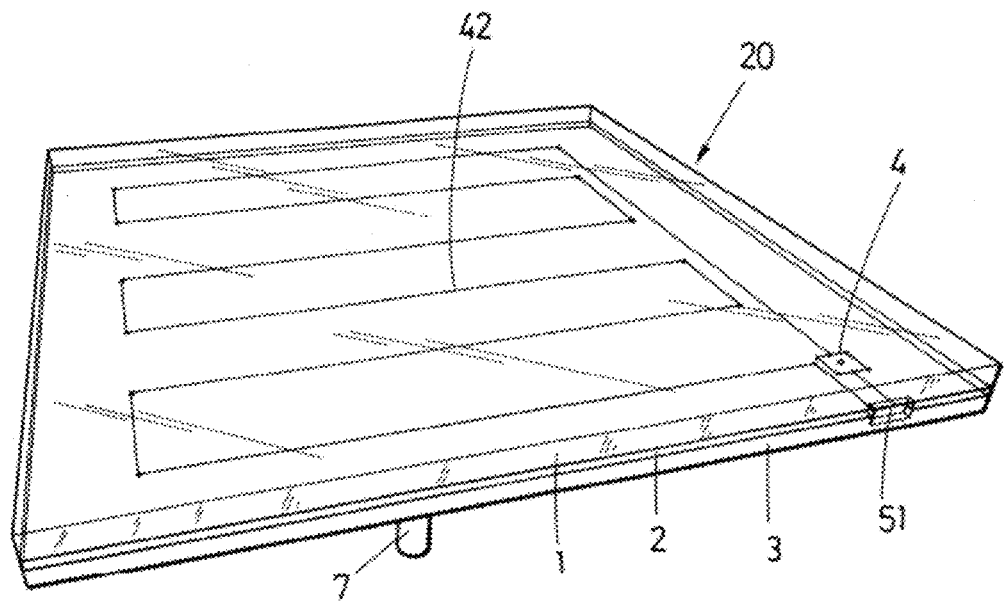
FIG. 10 shows a perspective view of a single faceted heliostat with a mirror on a supporting structure according to another embodiment of the invention.

FIG. 10 shows another exemplary embodiment of a mirror 20 on a supporting structure 7 constituting a single faceted heliostat type reflector. As in the previous case, the mirror 20 comprises a first transparent protective layer 1, a reflecting layer 2 and a second protective layer 3. Both the first layer 1 and the second protective layer 3 could act as a supporting layer. In this solution, a breakage sensor 4 has been included, connected to a power supply and breakage detection cable 42, both the sensor 4 and the cabling 42 being located, integrated in the second protective layer 3. The mirror 20 also comprises a connector 51 to which the components for power supply and data connection of the sensor 4 are connected.

Figure 11:
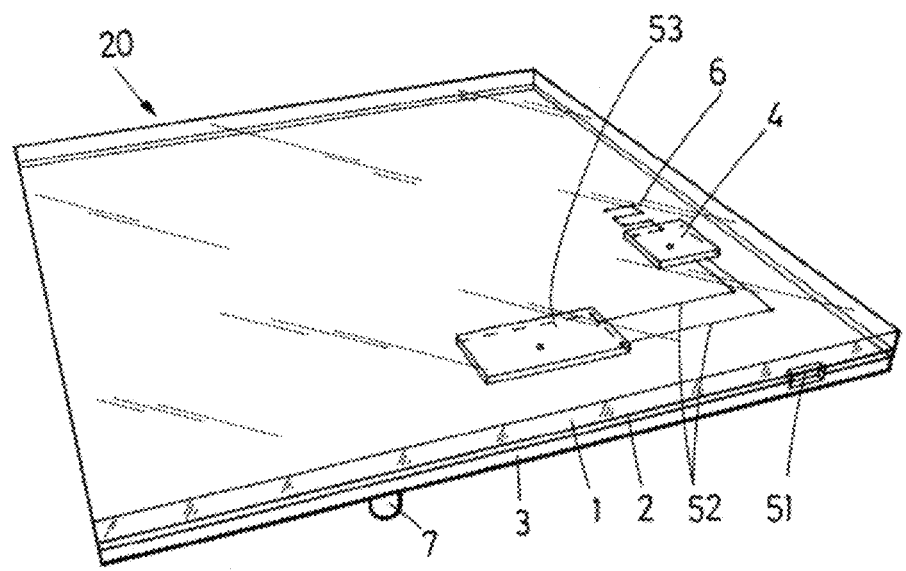
FIG. 11 shows a perspective view of a single faceted heliostat with a mirror on a supporting structure according to another embodiment of the invention.

FIG. 11 shows the last exemplary embodiment in which a mirror 20 is seen on a supporting structure 7, as in the case of FIGS. 9 and 10, the mirror 20 having a first transparent protective layer 1, a reflecting layer 2 and a second protective layer 3. Both the first layer 1 and the second protective layer 3 could act as supporting layer of the mirror 20. In this solution, the sensor 4 is located next to a battery 53 and next to a wireless antenna 6, all three integrated in the mirror, between the first layer 1 and the reflecting layer 2. The battery 53 is connected by means of power cabling 52 to the sensor 4, which is for example a tilt sensor, and the antenna 6 directly to the sensor 4. The wireless antenna 6 is used for wireless data transmission. A battery 53 that guarantees the life thereof during the lifespan of the mirror 20 will be used, since replacement thereof would be complicated, it being integrated in the mirror 20. A solution for replacing the battery and any other element integrated in the body of the mirror 20 that could be damaged or require replacement thereof, would consist of including accesses that are adequately watertight to the component, preferably through the second protective layer 3.

Although not explicitly mentioned the sensors may be arranged facing towards the front of the mirror, towards the back or to one side depending on the type of sensor and the functions required thereof.

Figure 12:
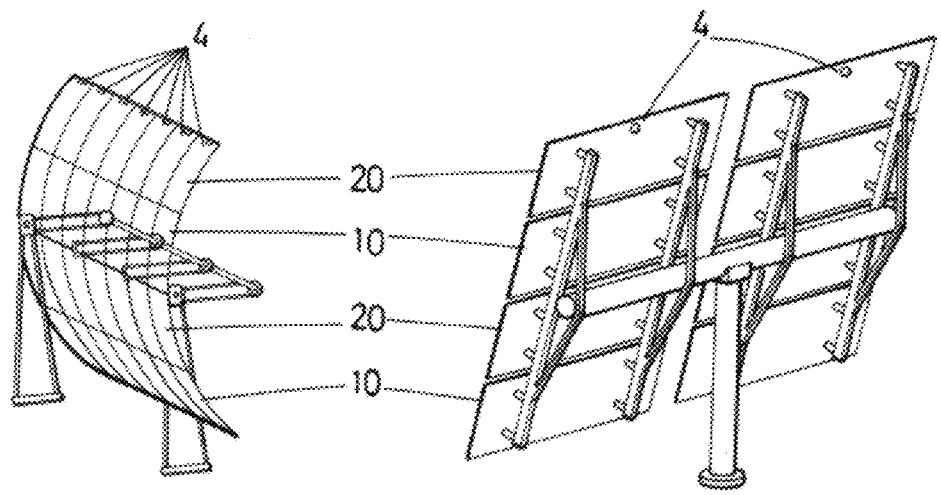
FIG. 12 shows two examples of solar reflectors, a parabolic trough on the left and a heliostat on the right, which include at least one mirror according to the present invention.

In this context, FIG. 12 shows two examples of multi-faceted solar reflectors, a parabolic trough on the left and a heliostat on the right, which include at least one mirror or facet according to the present invention. Specifically, it can be seen that said reflectors comprise a single row of mirrors with at least one sensor integrated in each mirror, while the other mirrors of the other rows are mirrors that do not comprise a sensor integrated therein. In other words, it is not necessary for all the mirrors of a solar reflector to include an integrated sensor so that a reflector can include a single mirror with several integrated sensors, or several mirrors, each with an integrated sensor. Therefore, a solar field may in fact contain solar reflectors with at least one mirror comprising at least one integrated sensor as well as solar reflectors with conventional mirrors, i.e., mirrors without an integrated sensor.

The foregoing examples relate to sensors integrated in the body of a mirror, which, as mentioned previously, may or may not incorporate a processor. Furthermore, the description of the previous figures can be extended to those cases in which, in addition to a sensor and other described components, the mirror integrates a processor associated to the sensor but not incorporated in it, such that depending on whether or not there exists a processor in the mirror, a sensorized mirror or a smart mirror is made available.

It is also apparent from the foregoing that the sensor, the means of connection and the power supply means can make up the same element or component integrated in the body of the mirror, regardless of whether or not said component incorporates a processor.

Figure 13:
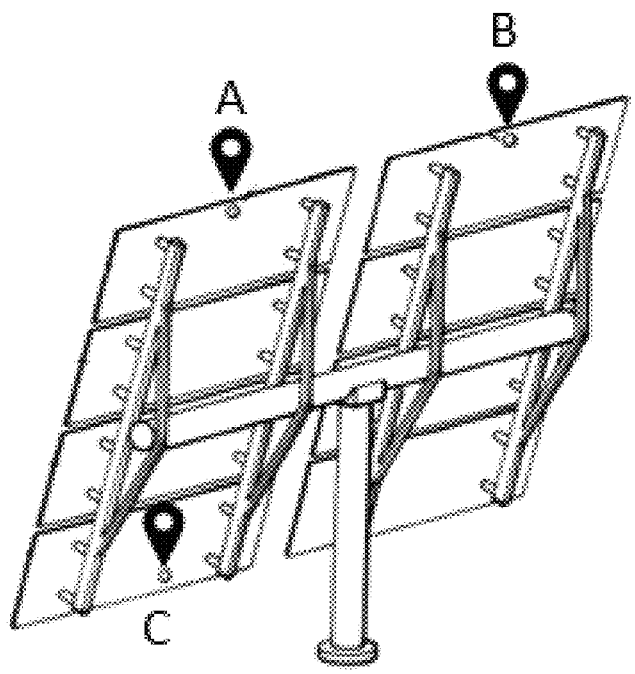
FIG. 13 shows a perspective view of a heliostat solar reflector with three smart mirrors.
Figure 14:
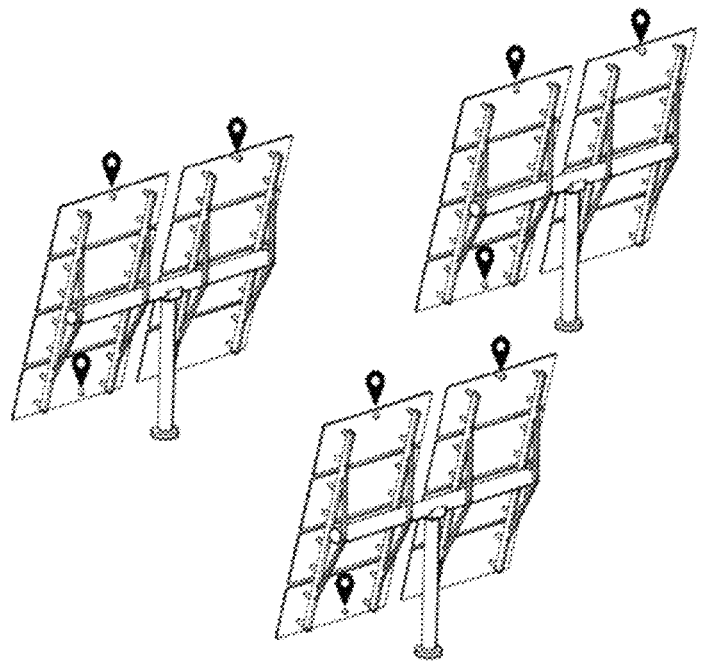
FIG. 14 shows a perspective view of three solar heliostats each of them having at least one smart mirror.

Hereafter, and with reference to FIGS. 13 and 14, two operating cases are described in which two or more mirrors object of the present invention share information or use information or signals generated by another mirror in order to improve the operation of the reflector on which they are mounted, that of another reflector or that of the field in general. Preferably, the three mirrors are smart mirrors, i.e., those comprising a processor in addition to at least one sensor, transmission and power supply means.

FIG. 13 shows a heliostat as a solar reflector with eight mirrors, three of which are mirrors according to the present invention and more specifically, smart mirrors. If each of said three smart mirrors has the capacity to measure its position thanks to, for example, a GPS (Global Positioning System) or differential GPS type sensor, they have the capacity to connect with each other and a processor in order to manage the information gathered by the sensor, the possibility of generating new additional information of interest for the control of the heliostat on which they are installed automatically appears.

By way of example, if the position of the smart mirror wherein each sensor is integrated is perfectly known, since they are integrated in the mirror during the manufacturing phase of the mirror and prior to installation in the heliostat, subsequently their position in the heliostat is also known and therefore the position of points A and B in each mirror will be known. This allows knowing the orientation of the straight line that joins both points, since the processors of both smart mirrors exchange the position information captured by the sensors, and therefore enables obtaining information on the azimuth orientation of the heliostat that incorporates these two smart mirrors. Similarly, by knowing the position of points A and C in the smart mirrors, information on the elevation orientation of the heliostat incorporating said two smart mirrors can be obtained.

A possible method of implementation would include the following stages:
  Collecting information from the sensors on the status thereof (in this example information on the position thereof),
  Exchanging this information with the neighboring mirrors,
  Analyzing the available information by at least one of the processors associated with the sensors of the mirrors.
  Generating information by at least one of the processors on the azimuth orientation (AB straight line) and the elevation orientation (AC straight line) based on the available information.
  Transmitting the new information that has been generated to the control unit of the heliostat.

FIG. 14 shows three heliostats similar to those described previously in FIG. 13, i.e., three heliostats with eight mirrors each, which comprise three smart mirrors. The incorporation of said smart mirrors endows them with the capacity to connect with each other, thanks to the integrated processors and means of connection, as well as the capacity to analyze the information captured or gathered by the integrated sensors, such that they will be capable of analyzing the orientation of the neighboring heliostats, continuously analyzing the possibilities of collision, the shadows and blockages that can occur between them and making decisions that optimize production and safety of the plant in which said heliostats are installed.

Figure 15:
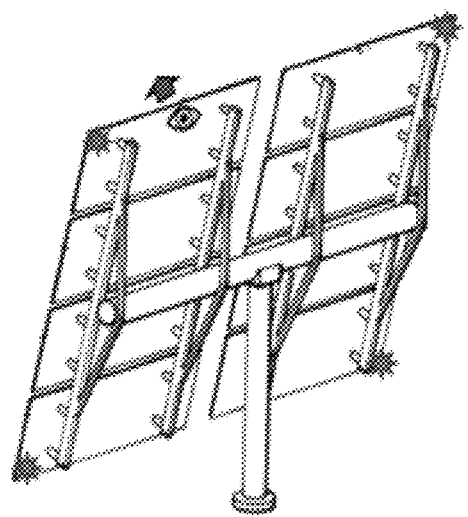
FIG. 15 shows a perspective view of a heliostat with several mirrors, smart mirrors or not, object of the present invention.

FIG. 15 shows a heliostat with eight mirrors, four of which comprise a sensor, an active element, specifically a light device, for example a LED-type device, and one of said four mirrors comprises a second sensor, a vision device capable of capturing images of the surroundings of the heliostat and a processor, the latter therefore being a smart mirror according to the present invention. One objective of the sensors or light devices is that they can be seen by other elements or devices, external to the heliostat where they are installed, so that these other elements or devices can identify the positions thereof and consequently the overall position and orientation of the reflector on which they are installed. Additionally, these sensors or light devices can change color indicating an operational status or a failure of the mirror itself, of the reflector on which it is installed or of some other element of the field with which it establishes some kind of communication and exchanges information.

Figure 16:
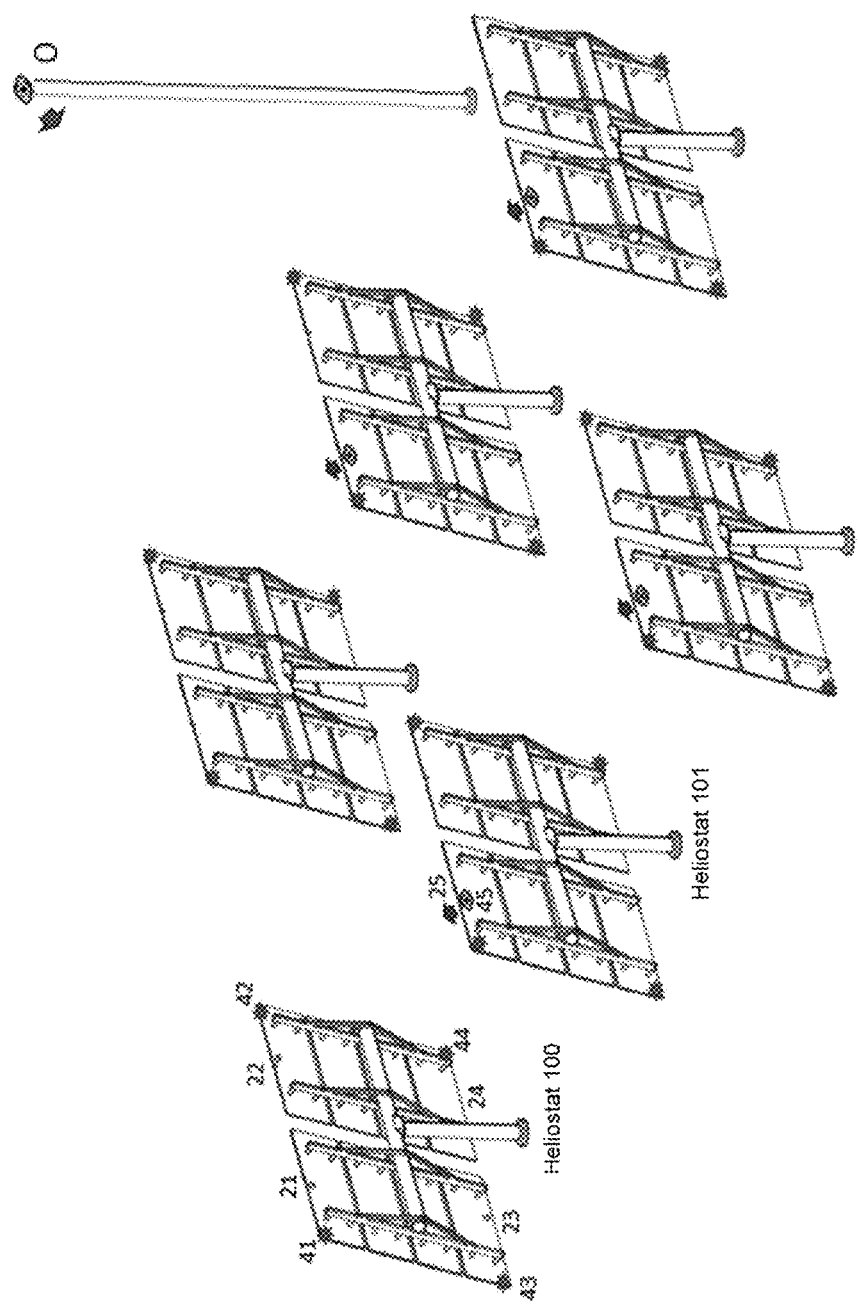
FIG. 16 shows a perspective view of a group of heliostats with several mirrors, object of the present invention.

FIG. 16 shows a group of heliostats such as those of FIG. 15. In these heliostats, smart mirrors with vision capacity will be able to identify the light devices of other smart mirrors and, thanks to the connection and processing capacity, will be able to calculate the position and orientation of neighboring heliostats and communicate it to said heliostats and/or a central control unit. In this example, another possible implementation is shown incorporating a vision system external to the heliostats placed in an elevated "O" position, such that it can observe and identify the light devices and consequently know the positions and orientations of the reflectors of a part of the solar field, thanks to the information captured by the vision system external to the heliostats as well as the information that the smart mirrors can provide to the processor or smart unit of said external vision system. Furthermore, thanks to the connection and processing capacities between the mirrors and/or an external control unit, it is possible to turn the light devices on or off in order to facilitate their identification.

One possible method of actuating the four mirrors (21, 22, 23, 24) of a first heliostat (100) would include the following stages:
- The mirrors (21, 22, 23, 24) receive an instruction from a device external to the first heliostat (100) in order to switch on their integrated sensors (41, 42, 43, 44) and which are active elements (LED devices) that emit light signals, and
- The integrated sensors (41, 42, 43, 44) of the mirrors (21, 22, 23, 24) switch on generating information of interest for a sensor (45) of a smart mirror (25) of a second heliostat (101) and/or for other sensors in other heliostats or systems external to the heliostats, such as, for example, an elevated vision system (0).

On the other hand, a possible method of actuation of the smart mirror (25) including the sensor (45) located on a second heliostat (101) would include the following stages:
- The sensor (45) integrated in the smart mirror (25) of the second heliostat (101) emits an activation instruction to the mirrors (21, 22, 23, 24) of the first heliostat (100),
- The sensor (45) of the smart mirror (25) gathers the information by capturing an image from the sensors (41, 42, 43, 44) of the mirrors (21, 22, 23, 24) of the first heliostat (100) once activated,
- The sensor (45) of the smart mirror (25) analyzes the image by means of the processor in the smart mirror (25) associated to the sensor (45),
- The sensor (45) of the smart mirror (25) generates information on the position and orientation of the first heliostat (100), and
- The sensor (45) of the smart mirror (25) transmits the generated new information to the control unit of the first heliostat (100), or to the neighboring heliostats.

Foregoing FIGS. 14 to 16, in spite of describing heliostats comprising mirrors according to the present invention, also describe associations or groups of heliostats that exchange information between each other thanks to the sensors integrated in the mirrors that make up said heliostats, as well as the processor that said sensors or mirrors incorporate. The group of heliostats with mirrors according to the present invention, for the purposes of the present application, is referred to as an intelligent solar field or smart field. This concept refers to the connection capacity between different mirrors arranged in solar reflectors with the aim of exchanging or transmitting information captured by the sensors of the different mirrors. By implementing these mirrors in the reflectors of a plant, great advantages are obtained in the solar field due to the interrelation and relation with all the components of the solar field (other mirrors, reflectors and processors of external elements), that enable, among others, more effective management, monitoring and control of the solar field.

Currently most of the management, monitoring and control activities in a solar field are defined by a central control or a central control unit, which sends signals to the different reflectors of the solar field so that they carry out the movements that are required for their optimal operation. Thus, for example, the central control is responsible for calculating, among others, the following specific parameters of the solar field: calculating the solar vector, calculating the reflected beam, refraction correction, calculating the required position of solar reflectors or heliostats, status thereof, offset adjustments, alarms, etc. In addition, the central control also carries out other functions not specific to the solar field, such as cloud detection, measuring meteorological parameters, calculating solar flux, calculating dirt levels, assessing the need for cleaning and repair operations, and which could be fully or partially assumed by a duly grouped assembly of mirrors according to the present invention.

Thus, an intelligent solar field or smart field incorporates at least one mirror in a first reflector according to the present invention, i.e., integrating at least one sensor, means of connection and power supply means, and preferably a processor, giving rise in the latter case to a smart mirror, and it also incorporates an external processor, which can be located in another smart mirror of a second reflector or in a device with a processor in the solar field, such as, for example, the central control. According to the present invention, the mirrors that are included in the intelligent solar field or smart field will be able to share with each other and/or with other elements of the solar field or plant, that are not mirrors, the information gathered and/or generated by the sensors and generate additional information based on the available information. Thus, the smart field can not only provide information of interest for managing the solar field but also incorporate self-diagnosis capacities being able to operate autonomously or semi-autonomously based on the information provided by the mirrors thereof, reducing communication needs with the central control and even assuming part of the features thereof.

Figure 17:
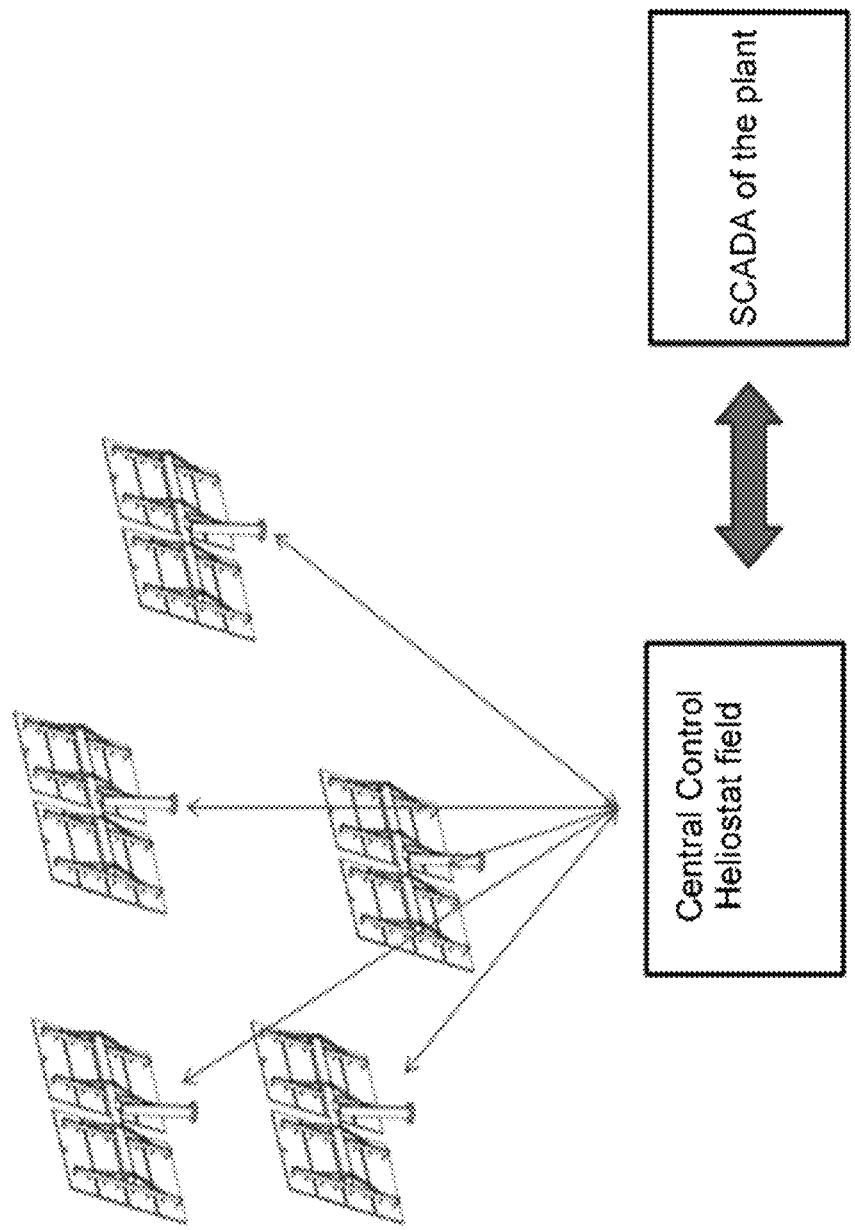
FIG. 17 shows a first exemplary embodiment of a group of heliostats that make up a solar field.
Figure 18:
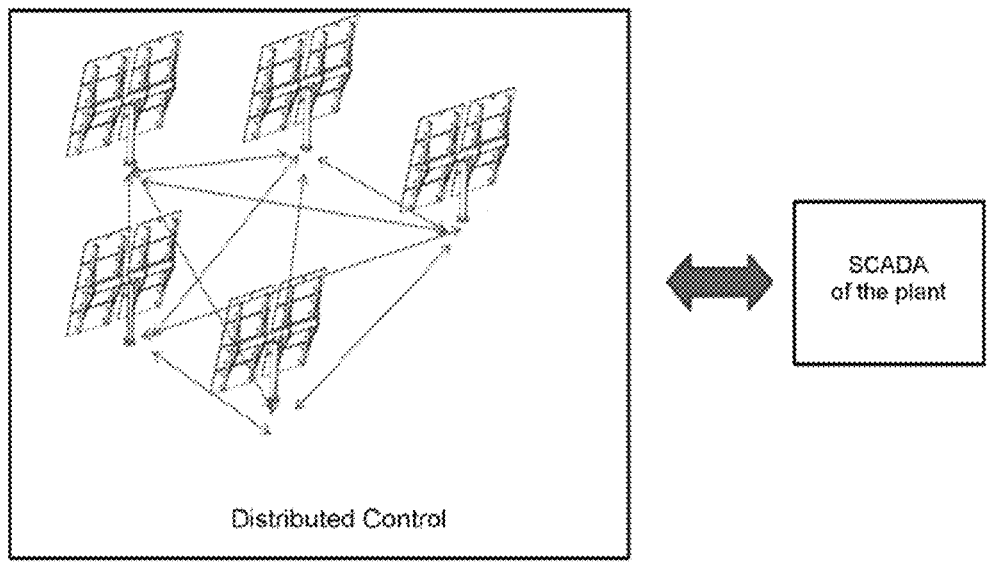
FIG. 18 shows a second exemplary embodiment of a group of heliostats that make up a solar field.
Figure 19:
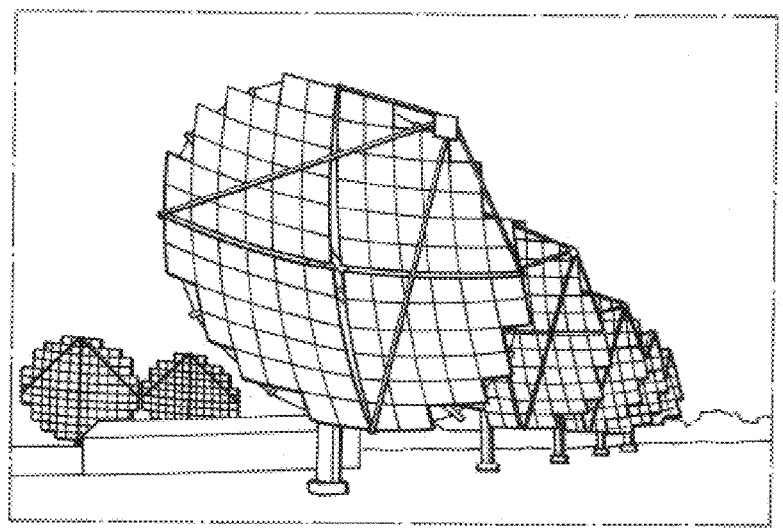
FIGS. 19 to 24 show several examples of different solar reflectors already known in the state of the art and to which the mirror, object of the present invention, can be applied.
Figure 20:
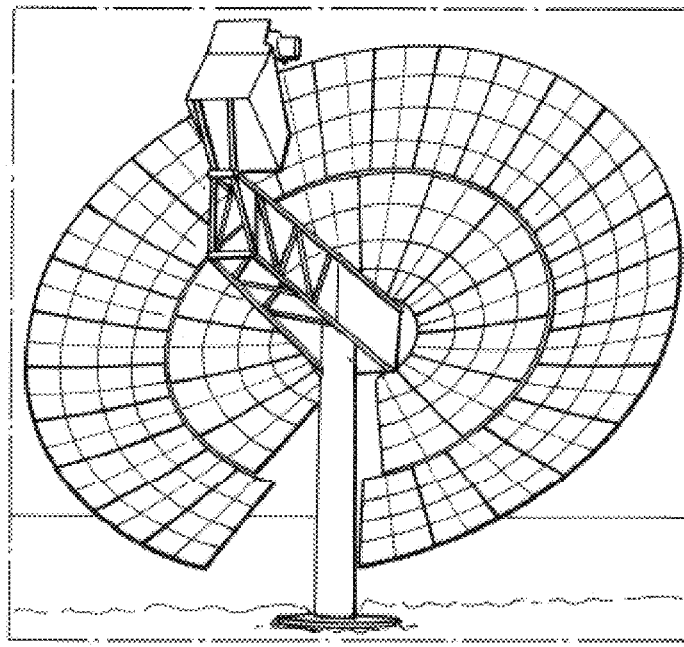
Figure 21:
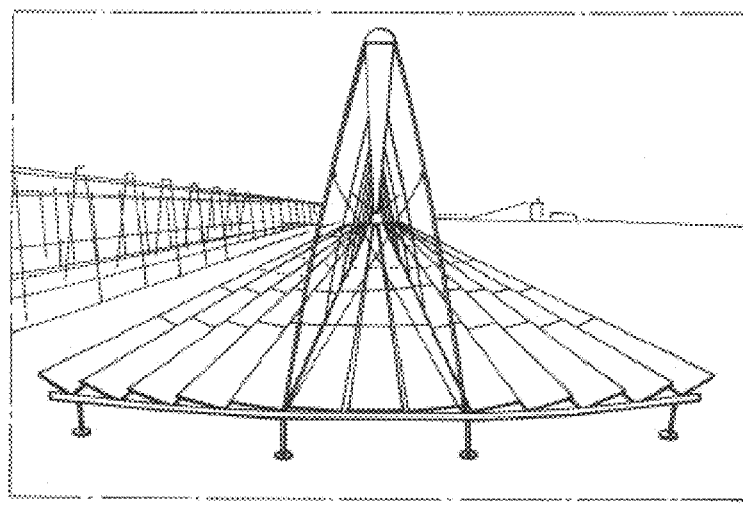
Figure 22:
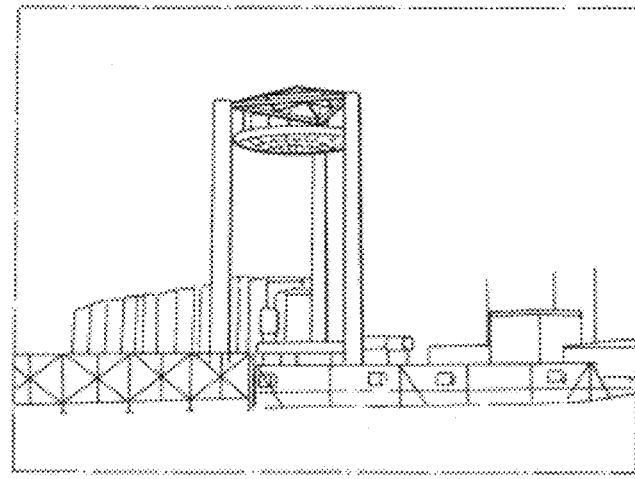
Figure 23:
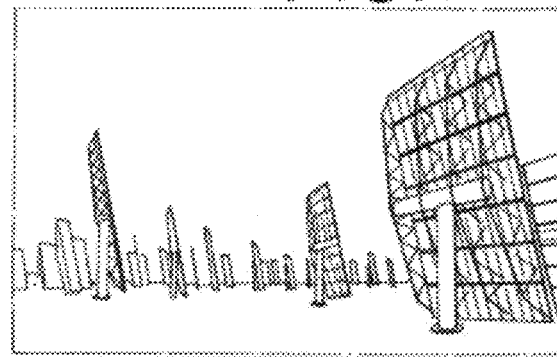
Figure 24:
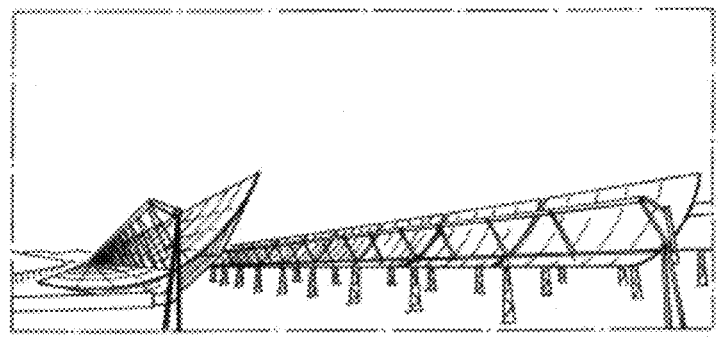

Accordingly, and based on FIGS. 17 and 18, there are two main modes for implementing a mirror interaction and management system for solar reflectors in a commercial solar field or plant according to the invention.

FIG. 17 shows a centralized management system or centralized operation of a central receiver plant with heliostats, wherein preferably at least one mirror of each heliostat has an integrated sensor, means of connection and power supply means, and preferably one processor, which may or may not be incorporated in the sensor, and if it is not incorporated therein, the processor should be integrated in the mirror (giving rise to a smart mirror), and a processor external to the mirrors, which in this case is a central control unit. Through this system, mirrors, preferably smart mirrors, carry out operations to assess their own status and/or surroundings, interact with neighboring elements, process the data and generate information that they subsequently communicate to the central control unit or to other local controls so that they incorporate this information into their analysis and are thus able to improve the operation of the solar plant. The information generated and exchanged between the different components of the plant is managed by the Supervisory Control and Data Acquisition (SCADA) system. Similarly, other elements in the field, such as solar receivers of parabolic trough reflectors or other monitoring systems such as solar flux measuring systems concentrated in tower plants, can take advantage of the information and/or signals that these mirrors provide in order to improve their operation.

FIG. 18 shows a decentralized management system wherein the mirrors of a central receiver plant with heliostats, also preferably smart mirrors, do not communicate the information they gather and/or generate to the central control, but based on the information and their capacities, they generate instructions for the operation of the solar field, assuming in part or totally the tasks of the central control unit, being able to execute said tasks themselves or share them with other external processors arranged in other elements or local devices in the solar field. In this case, only the information necessary to manage other elements of the plant and the minimum information necessary to execute the tasks of the field, which could not be assumed by the intelligent solar field or smart field, is communicated to the Supervisory Control and Data Acquisition (SCADA) system.

In addition to the above, there would exist intermediate options in which part of the decisions are made by smart mirrors that are capable of generating instructions for controlling the reflectors or other elements of the solar field while the central control unit maintains general control over the plant, commands part of the instructions governing the solar field and/or takes advantage of the information provided by the mirrors object of the invention.

The foregoing examples are only some of the construction possibilities of the invention object of the present application and should not be considered limiting.

What is claimed is:

1. A mirror for a solar reflector, comprising a body with:
    a reflecting layer having a top and a bottom,
    a first transparent protective layer covering the top of the reflecting layer, and
    at least one second protective layer covering the bottom of the reflecting layer,
    wherein the mirror comprises:
        at least one sensor integrated in the body of the mirror,
        a connection for transferring data, and
        a sensor power supply
    wherein:
        the at least one sensor integrated in the body of the mirror, is arranged in and/or between the layers of the mirror, and is an element or device for identifying the mirror for monitoring and control thereof, and
        the mirror comprises a processor integrated in the body of the mirror, arranged in and/or between the layers of the mirror, for processing the available data and sending the data processing results through the means of connection.

2. The mirror according to claim 1, wherein the at least one sensor is an active or passive element.

3. The mirror according to claim 2, wherein when the at least one sensor is an active element, such active element emits acoustic signals, light signals and/or vibratory signals.

4. The mirror according to claim 2, wherein when the at least one sensor is a passive element that enables geometrical verification operations, and/or the calibration of vision devices, such passive element being encoded targets and/or geometrical patterns.

5. The mirror according to claim 1, wherein the mirror is configured to:
    interact with the surroundings thereof,
    characterize its own status,
    identify and characterize the status of elements in its surroundings,
    facilitate third parties with the identification and/or characterization of the mirror itself, and/or
    facilitate operations to other elements of the surroundings thereof.

6. The mirror according to claim 1, wherein the means of connection are integrated in the body of the mirror.

7. The mirror according to claim 1, wherein the power supply means are integrated in the body of the mirror.

8. The mirror according to claim 1, wherein the sensor comprises a processor for processing the acquired data and sending the results of the processing through the means of connection to a control unit.

9. The mirror according to claim 1, wherein the means of connection are wireless means.

10. The mirror according to claim 1, wherein the power supply means are wireless means.

11. The mirror according to claim 1, wherein the power supply consist of a battery or another power storage device.

12. The mirror according to claim 1, wherein the power supply means consist of a photovoltaic cell integrated in the body of the mirror.

13. The mirror according to claim 1, wherein at least one sensor can be selected from among a camera or artificial vision device, and/or those that detect mirror breakage by means of an integrated wire or cable, and/or measure the level of dirt on the mirror, and/or measure the tilt of the mirror, and/or measure the orientation of the mirror, and/or measure atmospheric or meteorological conditions, and/or detect the position of the sun, and/or measure the geometrical quality of the mirror, and/or identify the mirror, and/or measure the temperature, and/or measure the position of the mirror, and/or measure vibration levels, and/or carry out safety and surveillance operations, and/or identify the mirror for monitoring and control thereof.

14. The mirror according to claim 1, wherein a sensor is integrated, at least partially, in at least one of the layers, either the reflecting or the protective layer.

15. The mirror according to claim 1, wherein the body of the mirror comprises the first protective layer located above the reflecting layer, with a sensor arranged between said first protective layer and the reflecting layer.

16. The mirror according to claim 1, wherein the body of the mirror comprises the second protective layer located below the reflecting layer with a sensor arranged between said second layer and the reflecting layer.

17. The mirror according to claim 1, wherein the reflecting layer comprises a discontinuity in a determined area so that the sensor faces the first protective layer, when the sensor is located behind said reflecting layer.

18. The mirror according to claim 1, wherein the sensor is fully integrated in said layers.

19. The mirror according to claim 1, wherein the layer in which a sensor is integrated, surrounds said sensor.

20. A solar reflector, comprising at least one mirror according to claim 1.

21. A smart mirror interaction and management system for solar reflectors comprising at least one mirror according to claim 1, located in a solar reflector and at least one processor external to said mirror, said mirror being connected with the at least one external processor by means of connection for transmitting and/or exchanging data and information between the mirror and the external processor and/or between the external processor and the mirror.

22. The system according to claim 21, wherein the external processor is integrated in a mirror, and wherein the at least one sensor is an active or passive element.

23. The system according to claim 21, wherein the external processor is the processor of a smart device of an operator and/or a central control unit of the solar plant and/or a control unit of a second reflector.

24. The system according to claim 21, wherein it is configured to:
    generate information of interest including signals for other components of the solar plant including other mirrors,
    collect information on itself and on the surroundings thereof,
    exchange the collected information among the processors,
    analyze the available information,
    generate information based on the available information,
    transmit the new available information,
    generate instructions for itself or for other components.

25. A smart solar field, comprising:
at least one mirror according to claim 1, located in a first solar reflector, and
at least one processor external to said first reflector,
said mirror being connected directly or indirectly with at least said external processor.

26. The solar field according to claim 25, wherein the mirror is indirectly connected with the external processor through a processor located in the solar reflector.

27. The solar field according to claim 26, wherein processor in the solar reflector is the control unit of the reflector.

28. A method for manufacturing a mirror for a solar reflector, the mirror comprising a body with:
at least one reflecting layer having a top and a bottom,
a first transparent protective layer covering the top of the reflecting layer, and
at least one second protective layer covering the bottom of the reflecting layer,
the method comprising:
integrating a sensor in the body of the mirror by arranging the sensor in and/or between at least one of the layers of said mirror,
supplying the mirror for installation thereof in the reflector.

29. The method according to claim 28, comprising:
the integration stage in which at least one sensor is located in contact with at least one of the three layers that will make up the mirror after the assembly process, and
a subsequent stage in which said at least one sensor is covered with at least one of the protective layers, the sensor being integrated between said protective layers.

30. The method according to claim 28, wherein at least one sensor is located above and/or below and/or passing through the reflecting layer in the integration stage.

31. The method according to claim 28, wherein, in the integration stage, a housing is created in the first transparent protective layer and the sensor is located in said housing, and in a subsequent stage, the reflecting layer is applied below said first protective layer and thereafter a second protective layer is arranged below the reflecting layer, or alternatively the reflecting layer is applied on the second protective layer and subsequently these are joined with the first protective layer.

32. The method according to claim 31, wherein a discontinuity is carried out in an area of the reflecting layer in order to allow the sensor to face the first transparent protective layer.

33. The method according to claim 28, wherein, in the integration stage, a housing is created in the second protective layer and the sensor is located in said housing, and in a subsequent stage, the reflecting layer is applied on said second protective layer and thereafter the first protective layer is arranged on the reflecting layer, or alternatively the reflecting layer is applied on the first protective layer prior to joining these with the second protective layer.

34. The method according to claim 28, wherein, in the integration stage, a housing is created in a second ulterior protective layer and the sensor is located in said housing, and then a mirror, comprising three layers thereof, i.e., the second protective layer thereof with the reflecting layer and the first protective layer, is arranged on said second ulterior protective layer.

35. The method according to claim 28, wherein means of connection for transferring data between the sensor and the solar reflector control unit, and/or sensor power supply means, are positioned at the same time as the sensor.

36. The method according to claim 28, comprising:
integrating a processor in the body of the mirror by arranging the processor in and/or between one of the layers of said mirror, and
supplying the mirror for installation thereof in the reflector.

* * * * *